(12) United States Patent
Yamaoka

(10) Patent No.: US 9,747,467 B2
(45) Date of Patent: Aug. 29, 2017

(54) ANONYMIZED DATA GENERATION METHOD AND APPARATUS

(71) Applicant: FUJITSU LIMITED, Kawasaki-shi, Kanagawa (JP)

(72) Inventor: Yuji Yamaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 14/749,761

(22) Filed: Jun. 25, 2015

(65) Prior Publication Data
US 2015/0294121 A1  Oct. 15, 2015

Related U.S. Application Data

(63) Continuation of application No. PCT/JP2013/050631, filed on Jan. 16, 2013.

(51) Int. Cl.
G06F 21/62 (2013.01)
G06F 17/30 (2006.01)
H04L 29/06 (2006.01)

(52) U.S. Cl.
CPC .... G06F 21/6254 (2013.01); G06F 17/30563 (2013.01); G06F 17/30598 (2013.01); H04L 63/04 (2013.01); H04L 63/0421 (2013.01)

(58) Field of Classification Search
CPC ......... G06F 21/62; G06F 17/30; H04L 29/06; H04L 63/04
See application file for complete search history.

(56) References Cited

U.S. PATENT DOCUMENTS

2010/0114920 A1* 5/2010 Srivastava .......... G06F 21/6254
                                                         707/757
2011/0231408 A1   9/2011 Sasaki et al.
(Continued)

FOREIGN PATENT DOCUMENTS

JP   2004-013472   1/2004
JP   2011-197886   10/2011
(Continued)

OTHER PUBLICATIONS

Shinya Miyakawa, et al.; "Architecture and evaluation of a system for realizing secure distribution and utilization of privacy information", FIT2011, Proceedings of the 10th Forum on Information Technology, separate vol. 4, pp. 111-118, Aug. 22, 2011 (8 pages).
(Continued)

*Primary Examiner* — Brandon Hoffman
*Assistant Examiner* — Wasika Nipa
(74) *Attorney, Agent, or Firm* — Fujitsu Patent Center

(57) ABSTRACT

A method for generating anonymized data includes: (A) extracting, from plural data blocks, each of which includes a secret attribute value and a numeric attribute value, plural groups of data blocks, wherein each of the plural groups includes data blocks that include a first data block, which has not been grouped, whose frequency distribution of the secret attribute value satisfies a predetermined condition and whose numeric attribute values are within a certain area that has a predetermined size; and (B) replacing the numeric attribute values of the data blocks that belong to each group of the plural groups with a numeric attribute value calculated for the group. And, the certain area is determined without any relation with other certain areas for other groups.

8 Claims, 26 Drawing Sheets

(56) References Cited

U.S. PATENT DOCUMENTS

| | | | | |
|---|---|---|---|---|
| 2012/0124161 A1* | 5/2012 | Tidwell | ............... | G06F 21/6254 |
| | | | | 709/217 |
| 2012/0204026 A1 | 8/2012 | Shi et al. | | |
| 2013/0269038 A1 | 10/2013 | Takahashi | | |
| 2014/0019467 A1 | 1/2014 | Itoh et al. | | |

FOREIGN PATENT DOCUMENTS

| | | |
|---|---|---|
| JP | 2012-003440 | 1/2012 |
| JP | 2012-079205 | 4/2012 |
| JP | 2012-165374 | 8/2012 |
| WO | 2012/090628 | 7/2012 |
| WO | 2012/127572 A1 | 9/2012 |

OTHER PUBLICATIONS

Osman Abul, et al.; "Never Walk Alone: Uncertainty for Anonymity in Moving Objects Databases", In Proceedings of the 24th International Conference on Data Engineering, ICDE 2008, pp. 376-385, Apr. 7, 2008 (10 pages).

Ashwin Machanavajjhala et al.; "I-Diversity: Privacy Beyond k-Anonymity", ACM Transactions on Knowledge Discovery from Data, vol. 1, Issue 1, Article No. 3, Mar. 2007 (12 pages).

International Search Report, dated in connection with PCT/JP2013/050631 and mailed Feb. 5, 2013.

Ninghui, Li et al, "t-Closeness: Privacy Beyond k-Anonymity and I-Diversity", Data Engineering, ICDE 2007, IEEE 23rd International Conference on, IEEE, PI, Apr. 1, 2007, pp. 106-115.

Extended European Search Report dated Dec. 3, 2015, for corresponding European Paten Application No. 13871426.6, 8 pages.

* cited by examiner

| LINE NO. | ID | X (LATITUDE) | Y (LONGITUDE) |
|---|---|---|---|
| 1 | A | 6 | 2 |
| 2 | A | 4 | 4 |
| 3 | A | 2 | 4 |
| 4 | B | 6 | 10 |
| 5 | B | 4 | 8 |
| 6 | B | 2 | 8 |
| 7 | C | 1 | 6 |

| LINE NO. | ID | X | Y | SPEED |
|---|---|---|---|---|
| 1 | A | 0 | 1 | 0 |
| 2 | B | 2 | 0 | 2 |
| 3 | B | 3 | 1 | 1 |
| 4 | C | 3 | 4 | 1 |
| 5 | C | 4 | 4 | 2 |
| 6 | C | 5 | 7 | 3 |
| 7 | C | 6 | 6 | 1 |
| 8 | A | 7 | 2 | 1 |
| 9 | A | 7 | 3 | 2 |

FIG.4

| MESH ID | SET OF LINE NOs. |
|---------|------------------|
| (0,0) | {1,2,3,4,5} |
| (0,1) | {6} |
| (1,0) | {8,9} |
| (1,1) | {7} |

| ID | FREQUENCY |
|---|---|
| A | 1 |
| C | 3 |
| D | 4 |
| E | 9 |
| B | 10 |

FIG.16

| ID | FREQUENCY |
|---|---|
| A | 0 |
| C | 3 |
| D | 4 |
| E | 9 |
| B | 10 |

FIG.17

| ID | FREQUENCY |
|---|---|
| A | 0 |
| C | 0 |
| D | 4 |
| E | 9 |
| B | 10 |

FIG.18

| ID | FREQUENCY |
|---|---|
| A | 0 |
| C | 0 |
| D | 0 |
| E | 9 |
| B | 10 |

FIG.19

| ID | FREQUENCY |
|---|---|
| A | 0 |
| C | 0 |
| D | 0 |
| E | 1 |
| B | 10 |

FIG.20

| ID | FREQUENCY |
|---|---|
| A | 0 |
| C | 0 |
| D | 0 |
| E | 1 |
| B | 0 |

FIG.21

| ID | FREQUENCY |
|---|---|
| A | 1 |
| B | 2 |
| C | 3 |
| D | 4 |
| E | 5 |

FIG.24

| ID | FREQUENCY |
|---|---|
| A | 1 |
| B | 0 |
| C | 3 |
| D | 4 |
| E | 5 |

FIG.25

| ID | FREQUENCY |
|---|---|
| A | 1 |
| B | 0 |
| C | 2 |
| D | 4 |
| E | 5 |

FIG.26

| ID | FREQUENCY |
|----|-----------|
| A  | 1         |
| B  | 0         |
| C  | 2         |
| D  | 1         |
| E  | 5         |

FIG.27

| ID | FREQUENCY |
|----|-----------|
| A  | 1         |
| B  | 0         |
| C  | 2         |
| D  | 1         |
| E  | 4         |

FIG.28

| LINE NO. | GROUP ID |
|---|---|
| 1 | 1 |
| 2 | 1 |
| 3 | 1 |
| 4 | 1 |

FIG.29

| GROUP ID | SET OF UNTRANSFERRABLE LINE NOs. |
| | SET OF TRANSFERRABLE LINE NOs. |
|---|---|
| 1 | {1,2,4} |
| | {3} |

FIG.30

| LINE NO. | GROUP ID |
|---|---|
| 3 | 5 |
| 5 | 5 |
| 8 | 5 |
| 9 | 5 |

FIG.31

| GROUP ID | SET OF UNTRANSFERRABLE LINE NOs. |
|---|---|
| | SET OF TRANSFERRABLE LINE NOs. |
| 5 | {3,5,8} |
| | {9} |

FIG.32

| LINE NO. | GROUP ID |
|---|---|
| 1 | 1 |
| 2 | 1 |
| 3 | 5 |
| 4 | 1 |
| 5 | 5 |
| 8 | 5 |
| 9 | 5 |

FIG.33

| GROUP ID | SET OF UNTRANSFERRABLE LINE NOs. |
|---|---|
| | SET OF TRANSFERRABLE LINE NOs. |
| 1 | {1,2,4} |
| | |
| 5 | {3,5,8} |
| | {9} |

FIG.34

| LINE NO. | GROUP ID |
|---|---|
| 1 | 1 |
| 2 | 1 |
| 3 | 5 |
| 4 | 1 |
| 5 | 5 |
| 7 | 5 |
| 8 | 5 |
| 9 | 5 |

| GROUP ID | SET OF UNTRANSFERRABLE LINE NOs. |
|---|---|
| | SET OF TRANSFERRABLE LINE NOs. |
| 1 | {1,2,4} |
| | |
| 5 | {3,5,8} |
| | {7,9} |

| LINE NO. | X | Y | SPEED |
|---|---|---|---|
| 2 | 2 | 2 | 2 |

| LINE NO. | X | Y | SPEED |
|---|---|---|---|
| 2 | 2 | 2 | 2 |
| 4 | 2 | 2 | 1 |
| 1 | 2 | 2 | 0 |
| 8 | 5 | 4 | 1 |
| 5 | 5 | 4 | 2 |
| 9 | 5 | 4 | 2 |
| 7 | 5 | 4 | 1 |
| 3 | 5 | 4 | 1 | ated States Patent
US 9,747,467 B2

ANONYMIZED DATA GENERATION METHOD AND APPARATUS

CROSS-REFERENCE TO RELATED APPLICATIONS

This application is a continuation application, filed under 35 U.S.C. section 111(a), of International Application PCT/JP2013/050631, filed on Jan. 16, 2013, the entire contents of which are incorporated herein by reference.

FIELD

This technique relates to a technique for anonymizing information.

BACKGROUND

There is a case where records that were collected from plural information providers and include numeric attribute values are desired to be disclosed or provided for others while concealing an identifier of the information provider (hereinafter, which is abbreviated by an ID, simply) of each record. At this time, there is a case where others can presume the information provider for a record that has a characteristic numeric attribute value, even when the record is disclosed or provided after the ID is deleted.

For example, a case is considered where a collector of individual's position data provides the position data in a form that the information provider is unknown, for an analyzer. Here, the collector may be a service provider who provides the service regarding the position data, and the analyzer may be a cloud service provider, a data secondary user (e.g. apopulation density investigation company or the like) and the like.

Here, assume that the position data collected by the collector is as depicted in FIG. 1. In an example of FIG. 1, each record includes a line number, an ID, an X coordinate (latitude) and a Y coordinate (longitude). Here, each record represents the position data of any one person among three persons A, B and C, and the total number of records is 7. In other words, plural records for the same ID may appear. In addition, the ID may be a user ID of the individual or an ID of a measurement equipment. Moreover, the ID may be an ID of a department to which the user belongs.

When data as depicted in FIG. 1 is plotted on a map, the map as depicted in FIG. 2 is obtained, for example. When the analyzer can obtain data as depicted in FIGS. 1 and 2, the analyzer can put the data to use the analysis. For example, it can be understood that persons gather in the vicinity of houses A and B.

However, for example, a situation is considered where a contract that the data is not provided for others as long as the anonymization is not performed is agreed between the collector and the information provider. The information provider may desire the anonymization because information regarding where the information provider was at a specific timing is desired not to be known to a person other than the collector or because there are some other reasons.

On the other hand, the analyzer may not use information of the information provider such as the ID. This is because the analysis such as the population density investigation can be performed even if the provider of the position data is not specifically identified.

In such a case, it is sufficient that the collector anonymizes the data in FIG. 1 to make it difficult to presume the information provider.

As a simple anonymization method by the collector, there is a method to delete the ID. Even if the analyzer watches data whose ID is deleted from FIG. 1, the analyzer cannot identify the informationprovider for each record, when the data is analyzed as it is. However, there is a problem that there is a record whose information provider can be presumed from the position data.

When data whose ID is deleted from FIG. 1 is plotted on the map as depicted in FIG. 2, it can be understood that the position data (X, Y)=(6, 2) in the first record is within the house A. In other words, even for the analyzer who can watch only data whose ID is deleted, it is possible to presume that the information provider of the first record is "A", and it cannot be said that the anonymization is sufficient. Similarly, the anonymization for records other than the seventh record is not sufficient.

As a conventional art, there is a method for grasping, as groups, plural numeric ranges that do not overlap each other and are predetermined and converting the records within each group into their statistical value.

In this conventional art, an area is meshed based on the latitude and longitude, and the statistical value for records within each mesh element is calculated, and then disclosed or provided.

As the statistical value, the number of records for each mesh element is used, for example, "3 records within a mesh element M1". Or, the ID may be deleted for each record, and the position of the record may be converted to a central point of the mesh element.

For example, a case is considered where respective records in FIG. 1 are grouped by mesh elements whose length of one side is "5" and are converted. In such a case, for example, (X, Y)=([5, 10), [0, 5)) corresponds to one mesh element, i.e. a group. When this mesh element is temporarily named as M10, only the first record in FIG. 1 is classified into M10. Therefore, a matter "there is one record in the mesh element M10" is disclosed, or the first record is converted to (X, Y)=(7.5, 2.5) (i.e. the central point of M10) and disclosed.

In this conventional art, when the mesh size is sufficiently large, no problem arises for the anonymization. However, there is a problem that the anonymization is threatened when the mesh size becomes small. For example, if the mesh element M10 is included in a site of the house A (e.g. a case where the site of the house A is represented by (X, Y)=([2, 10], [0, 6])), it is possible to presume that the information provider of the record, which is classified to the mesh element M10, is "A". When the mesh size becomes smaller, the possibility becomes high that the mesh element is included in an area in which only a specific ID is sure to be exist.

On the other hand, when the mesh size becomes larger, the degree of generalization of the positions becomes greater. Therefore, there is a problem that the accuracy of the analysis by the analyzer is badly influenced. For example, there is a case where mesh elements whose length of one side is about 1 km are used in a statistical investigation. However, generally, it is impossible to present an analysis result regarding areas that are smaller than a 1 km square as long as only the result of the anonymization is used.

Thus, in order to guarantee the anonymity, this conventional art has to enlarge the mesh size, and there is a problem that the accuracy of the analysis is badly influenced.

Moreover, as another conventional art to generate groups, there is a technique for adjusting positions of ranges so that k (k is a preset value) or more records are included in a range whose size is less than a preset value d and ranges do not overlap each other, and for grouping based on those ranges.

This conventional art supposes records that have different ID from each other as target data, and in such a case, appropriate anonymity is guaranteed. However, there is a problem that it is impossible to guarantee the sufficient anonymity with respect to data in which plural records having the same ID exist as illustrated in FIG. 1.

For example, a case is considered where part of this conventional art is applied to group respective records in FIG. 1 so that a rectangle whose length of one side is less than "5" (i.e. d=(5, 5)) corresponds to a group and 3 or more (i.e. k=3) records are included in each group. In such a case, for example, two groups are obtained, one is a rectangle R43: (X, Y)=([2, 6], [2, 4]) including records {1, 2, 3} and the other is a rectangle R49: (X, Y)=([2, 6], [8, 10]) including records {4, 5, 6}. However, similarly to the aforementioned example, there is a possibility that the rectangle is included in an area in which only a specific ID is sure to exist. For example, when the rectangle R43 is included in the site of the house A, it is possible to presume that the information provider of the records {1, 2, 3}, which are classified to the rectangle R43, is A.

Typically, a method that can also handle records in which the same ID exists as illustrated in FIG. 1 is better, because an application range is broader. For example, especially in case where the information provider is an organization, there is a case where data of plural measurement equipments includes the same ID (i.e. organization ID). Moreover, by allowing the existence of plural records in which the same ID exists, it becomes possible to analyze a lot of records once, and the enhancement of the analysis accuracy is expected. However, this conventional art can guarantee the anonymity only for special target data, and there is a problem that there is few application scenes.

Furthermore, as another conventional art for grouping, there is a technique for making the number of kinds of secret attribute values equal to or more than 1 within each group (i.e. a technique for satisfying l-diversity). This conventional art has a problem that it is difficult to make the size of the group less than a predetermined range. When the size of the group cannot be made to be less than the predetermined range, there is a problem that the accuracy of the analysis is badly influenced.

Non-Patent Document 1: O. Abul, F. Bonchi, and M. Nanni. Never Walk Alone: Uncertainty for Anonymity in Moving Objects Databases. In Proceedings of the 24th International Conference on Data Engineering, ICDE 2008, pp. 376-385 (2008).

Non-Patent Document 2: A. Machanavajjhala, J. Gehrke, D. Kifer, M. Venkitasubramaniam. l-Diversity: Privacy Beyond k-Anonymity. ACM Transactions on Knowledge Discovery from Data, Vol. 1, Issue 1, Article No. 3, 2007.

SUMMARY

An anonymized data generation method relating to this technique includes (A) extracting, from plural data blocks, each of which includes a secret attribute value and a numeric attribute value, plural groups of data blocks, wherein each of the plural groups includes data blocks that include a first data block, which has not been grouped, whose frequency distribution of the secret attribute value satisfies a predetermined condition and whose numeric attribute values are within a certain area that has a predetermined size; and (B) replacing the numeric attribute values of the data blocks that belong to each group of the plural groups with a numeric attribute value calculated for the group. And, the certain area is determined without any relation with other certain areas for other groups.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram depicting an example of data stored in a first data storage unit;

FIG. 16 is a diagram depicting an example of a frequency distribution table generated in the exclusion processing;

FIG. 17 is a diagram depicting an example of a frequency distribution table generated in the exclusion processing;

FIG. 18 is a diagram depicting an example of a frequency distribution table generated in the exclusion processing;

FIG. 19 is a diagram depicting an example of a frequency distribution table generated in the exclusion processing;

FIG. 20 is a diagram depicting an example of a frequency distribution table generated in the exclusion processing;

FIG. 21 is a diagram depicting an example of a frequency distribution table generated in the exclusion processing;

FIG. 24 is a diagram depicting an example of a frequency distribution table generated in the extraction processing;

FIG. 25 is a diagram depicting an example of a frequency distribution table generated in the extraction processing;

FIG. 26 is a diagram depicting an example of a frequency distribution table generated in the extraction processing;

FIG. 27 is a diagram depicting an example of a frequency distribution table generated in the extraction processing;

FIG. 28 is a diagram depicting an example of a frequency distribution table generated in the extraction processing;

FIG. 29 is a diagram depicting an example of a group correspondence table;

FIG. 30 is a diagram depicting an example of a group information table;

FIG. 31 is a diagram depicting an example of a group correspondence table;

FIG. 32 is a diagram depicting an example of a group information table;

FIG. 33 is a diagram depicting an example of a group correspondence table;

FIG. 34 is a diagram depicting an example of a group information table;

DESCRIPTION OF EMBODIMENTS

Figures 1, 2:
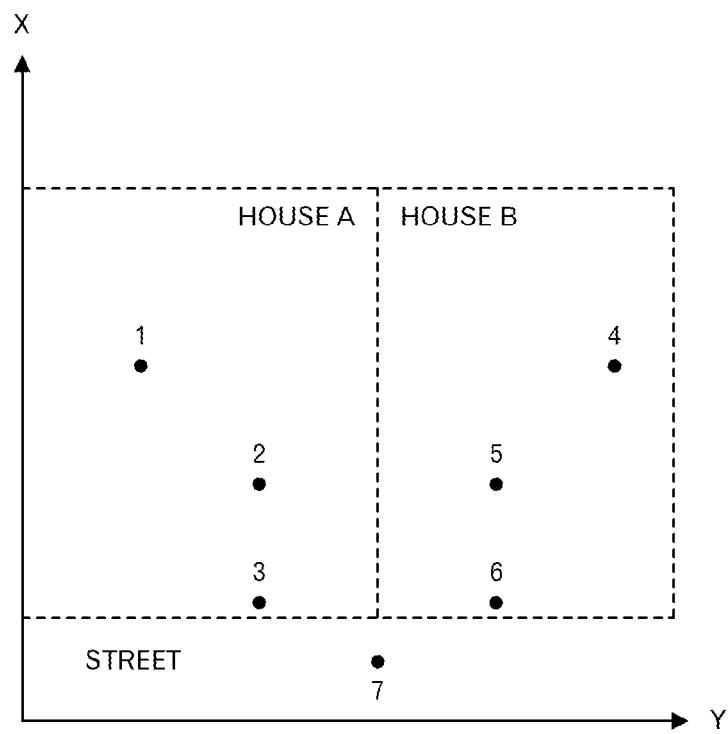
FIG. 1 is a diagram depicting an example of data.
FIG. 2 is a diagram depicting an example of superimposing data.
Figure 3:
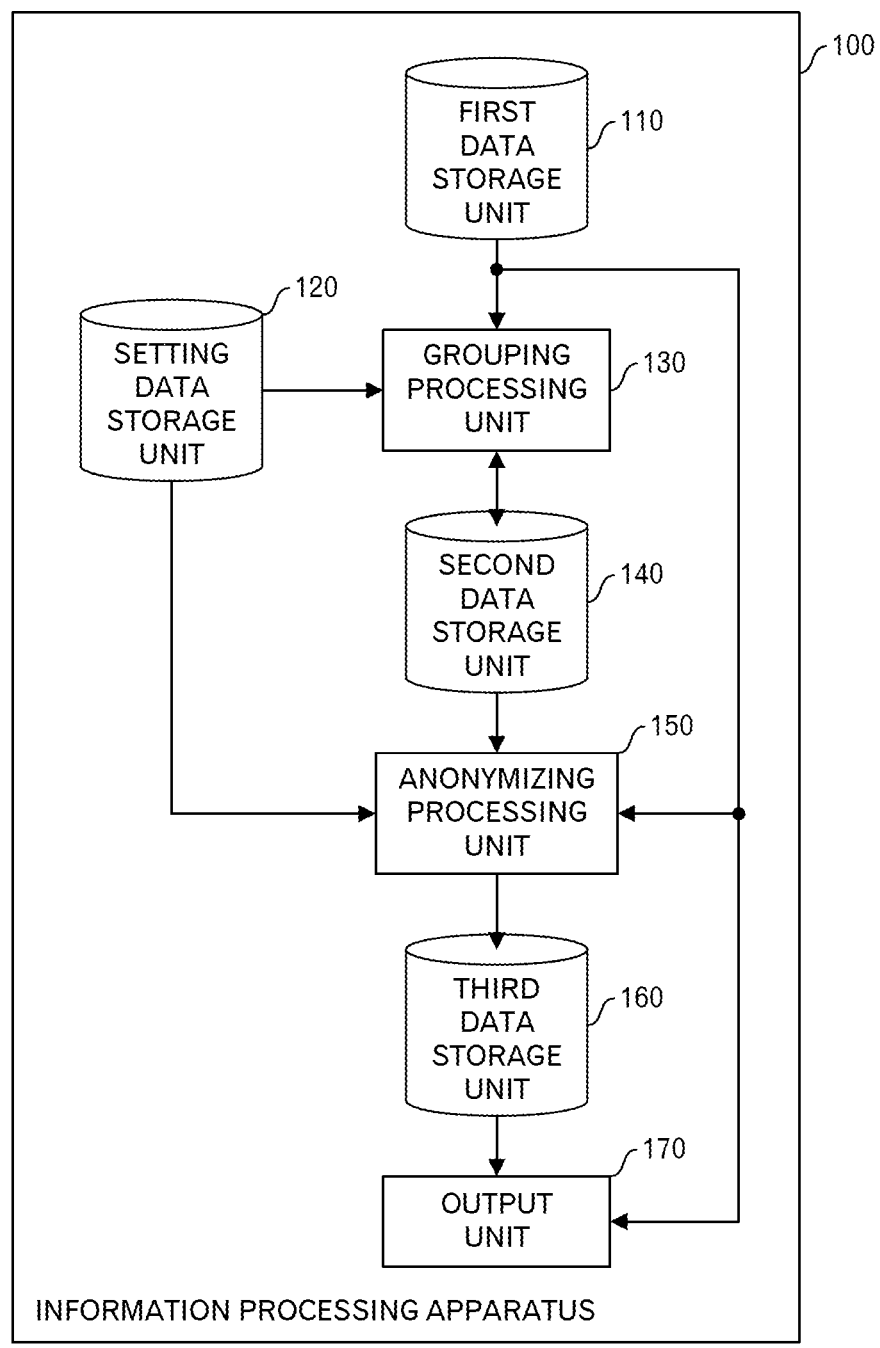
FIG. 3 is a diagram depicting a configuration example of an information processing apparatus relating to this embodiment.

FIG. 3 is a functional block diagram of an information processing apparatus 100 relating to this embodiment of this technique. The information processing apparatus 100 has a first data storage unit 110, a setting data storage unit 120, a grouping processing unit 130, a second data storage unit 140, an anonymizing processing unit 150, a third data storage unit 160 and an output unit 170.

The first data storage unit 110 stores data before the anonymization as illustrated in FIG. 4, for example. In an example of FIG. 4, each record (also called "a data block") includes an ID, an X (latitude) and a Y (longitude), and a speed. The line number is attached for following explanation.

Moreover, the setting data storage unit 120 stores the size "d" of the range, a condition regarding frequency distribution (also called "a frequency distribution pattern"), designation of secret attributes (e.g. ID attribute. this is also called "sensitive attribute") and numeric attributes (e.g. position data including the latitude X and longitude Y) in the data stored in the first data storage unit 110. The frequency distribution pattern includes the minimum number of kinds "l" and decrement "a". The minimum number of kinds "l" is an integer that is greater than 2, and the decrement "a" is a positive real number that is equal to or less than 1. For example, a condition is set as the frequency distribution pattern that the n-th frequency in descending order of the frequency with respect to the l-kinds of IDs is equal to or greater than "a" times of the (n−1)-th frequency.

The grouping processing unit 130 performs a processing to group records (hereinafter, a table D) stored in the first data storage unit 110, and stores a processing result in the second data storage unit 140. The anonymizing processing unit 150 performs a processing to convert numeric attribute values of records that belong to each group based on the result of the grouping, and stores a processing result in the third data storage unit 160. The output unit 170 outputs data stored in the third data storage unit 160 to other computers, display device, printer or the like.

Next, details of processing of the information processing apparatus 100 will be explained by using FIGS. 5 to 42.

Figure 5:
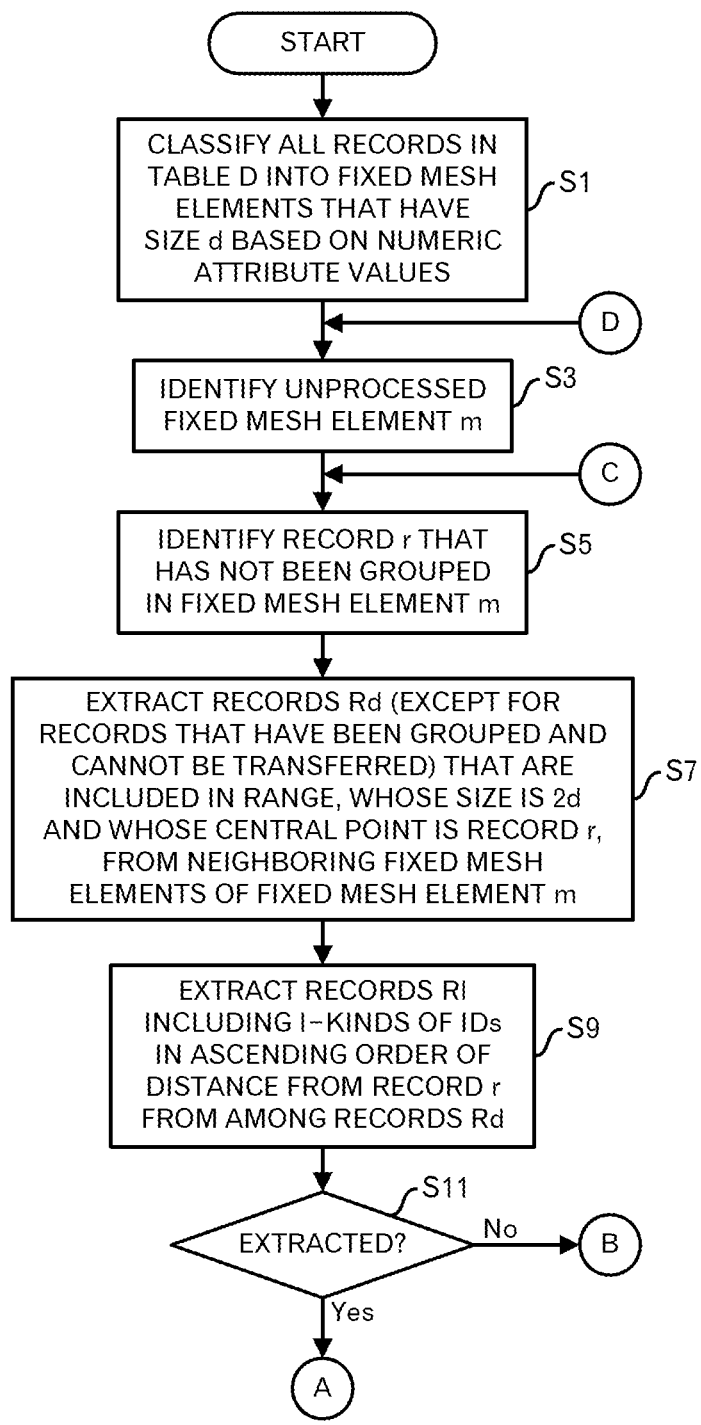
FIG. 5 is a diagram depicting a processing flow in this embodiment of this technique.
Figure 6:
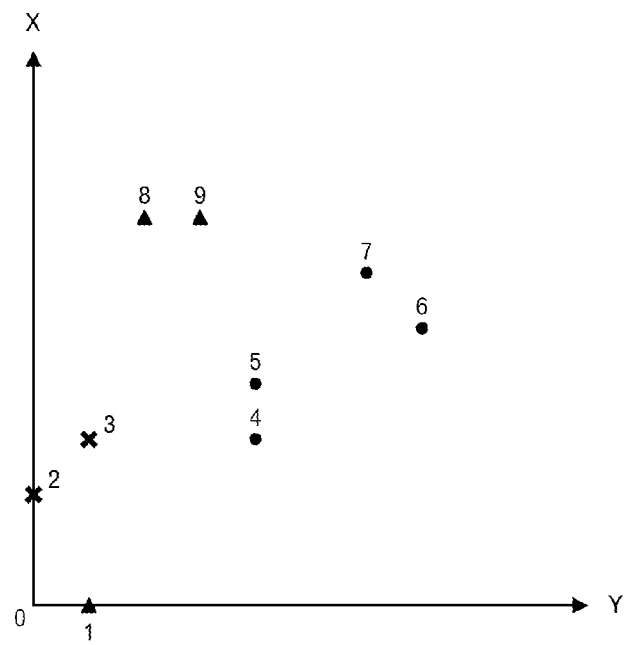
FIG. 6 is a diagram depicting an arrangement example of records.

Firstly, the grouping processing unit 130 classifies all records in the table D stored in the first data storage unit 110 into fixed mesh elements whose size is d based on the numeric attribute values of the records (FIG. 5: step S1). Firstly, assume that the latitude and longitude XY are set as the numeric attributes, and furthermore, d=(6, 6) are also set in the setting data storage unit 120. Then, records as illustrated in FIG. 4 are placed on an XY plane as illustrated in FIG. 6. Plots having the same form represent records having the same ID.

Figure 7:
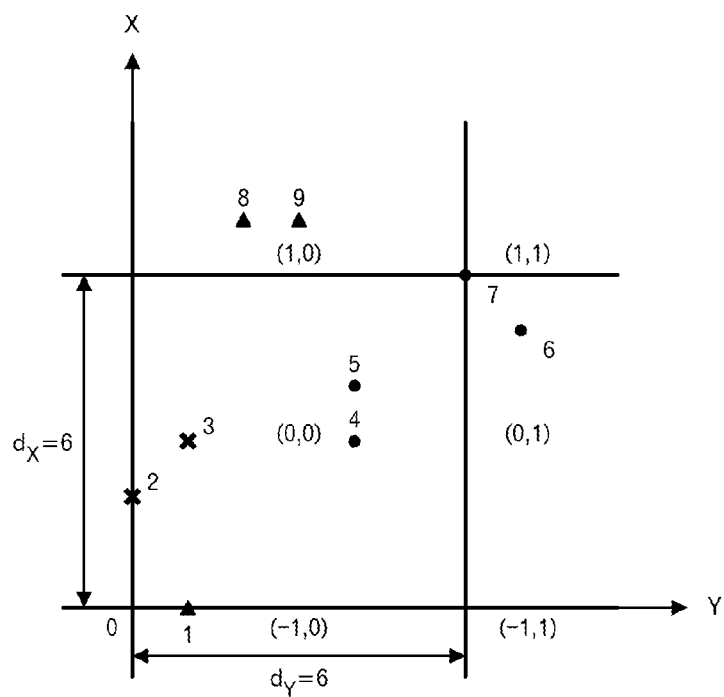
FIG. 7 is a diagram depicting a state where fixed mesh elements are arranged.

Then, at this step, as illustrated in FIG. 7, fixed mesh elements having d=($d_x$, $d_y$)=(6, 6) are placed, and then by extracting, for each fixed mesh element, records included in the fixed mesh element, the classification is performed. Assume that the side that corresponds to the upper limit value of the range, which represents the fixed mesh element, is not included in the fixed mesh element.

This is a preprocessing in order to enhance the speed of following processing, and in this embodiment, a following group-ID generation function is used.

$$f(R)=(\text{floor}(X/6),\text{floor}(Y/6))$$

Here, floor (Q/S) is a function to set Q to a value that is near a multiple of S by truncation. In addition, f(R) is a function to calculate a group ID of a record R that includes the latitude X and longitude Y.

Figures 8, 9:
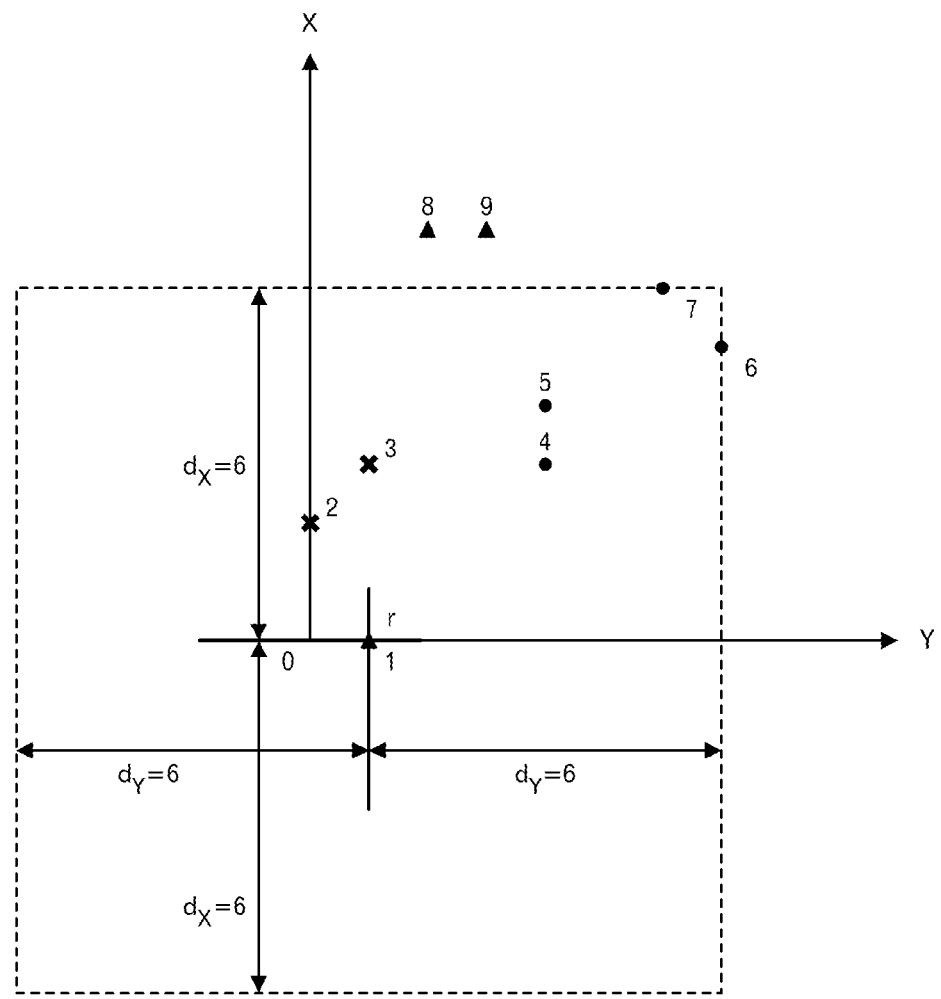
FIG. 8 is a diagram depicting an example of a correspondence table between IDs of the fixed mesh elements and records.
FIG. 9 is a diagram to explain records Rd.

According to the example of FIG. 4, classification as illustrated in FIG. 8 is obtained. In an example of FIG. 8, records {1, 2, 3, 4, 5} belong to the fixed mesh element whose mesh ID is (0, 0), a record {6} belongs to the fixed mesh element whose mesh ID is (0, 1), records {8, 9} belong to the fixed mesh element whose mesh ID is (1, 0), and a record {7} belongs to the fixed mesh element whose mesh ID is (1, 1).

In a correspondence table as illustrated in FIG. 8, records are sorted in ascending order of the mesh ID. Moreover, line numbers for each mesh element are sorted in ascending order of the numeric attribute values of records that belong to that mesh element.

After that, the grouping processing unit 130 identifies one unprocessed fixed mesh element m in the generated correspondence table (step S3). Furthermore, the grouping processing unit 130 identifies one record r, which has not been grouped in the fixed mesh element m (step S5). For example, when the mesh element whose mesh ID is (0, 0) is identified as a fixed mesh element m to be processed, records, which have not been grouped, are {1, 2, 3, 4, 5}. Here, a record r=1 is identified as a record to be processed.

Then, the grouping processing unit 130 extracts records Rd (however, except for records that have been grouped but cannot be transferred) that are within a range whose size is "2d" and which are determined using the record r as a central point from among neighboring fixed mesh elements of the fixed mesh element m (step S7).

The neighboring fixed mesh elements are fixed mesh elements, which have mesh IDs calculated by adding any one of −1, 0 and +1 to the numeric value of each element of the mesh ID. And in case of mesh ID=(0, 0), the fixed mesh elements whose mesh IDs are (−1, −1), (−1, 0), (−1, 1), (0, −1), (0, 0), (0, 1), (1, −1), (1, 0) and (1, 1) are the neighboring fixed mesh elements. In case where the mesh ID of the fixed mesh element m is (0, 0), the candidate records are {1, 2, 3, 4, 5, 6, 7, 8, 9}.

Furthermore, the range whose size is "2d" and which is determined using the record "r" as the central point is a range −6 (=0−6)<X<6 (=0+6) and −5 (=1−6)<Y<7 (=1+6), because the coordinates (X, Y) of the record "r" is (0, 1). Specifically, a state as illustrated in FIG. 9 is obtained. In FIG. 9, records are extracted, which are included in the range surrounded by a dotted-line rectangle whose length of one side is "2d" and whose central point is the record "1". However, records on the sides are not included in the range. Therefore, records {1, 2, 3, 4, 5} among the candidate records are included in the records Rd. The records Rd becomes a set of records, which is a base of the following processing.

Figure 10:
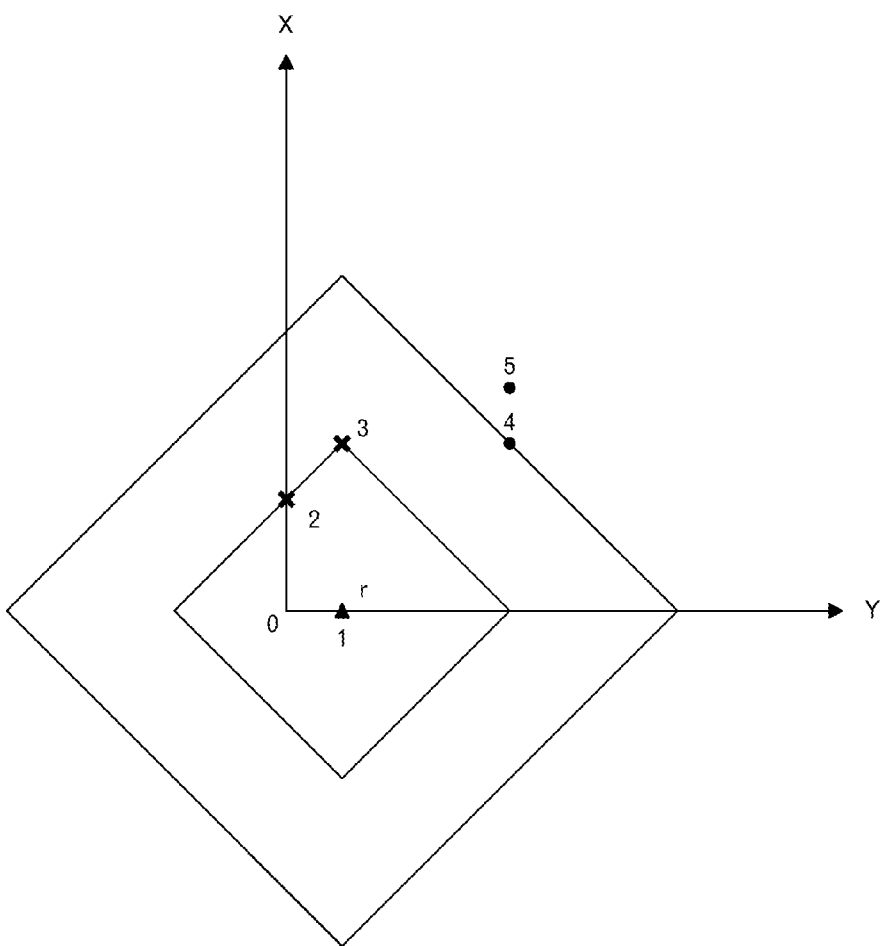
FIG. 10 is a diagram to explain records Rl.

Then, the grouping processing unit 130 performs a processing to extract records Rl of l-kinds (the minimum number of kinds in the frequency distribution pattern) of IDs in ascending order of the distance from the record "r" from among the records Rd (step S9). For example, the Manhattan distance is used for the distance. At this step, as illustrated in FIG. 10, the records "2" and "3" are included in the range of the Manhattan distance "3" from the records "r", however, either of the records is selected because they have the same ID. In case of the same Manhattan distance, a record, which appears anteriorly in the sorting order, is selected. Furthermore, the record "4" is included in a range of the Manhattan distance "6". Because the IDs of the records "1", "2" and "4" to be processed are different from each other, the records Rl={1, 2, 4} are extracted when l=3 is set in the setting data storage unit 120.

Here, when the records Rl can be extracted (step S11: Yes route), the processing shifts to step S13 in FIG. 11 through terminal A, and when the records Rl cannot be extracted (step S11: No route), the processing shifts to step S25 in FIG. 11 through terminal B.

Figure 11:
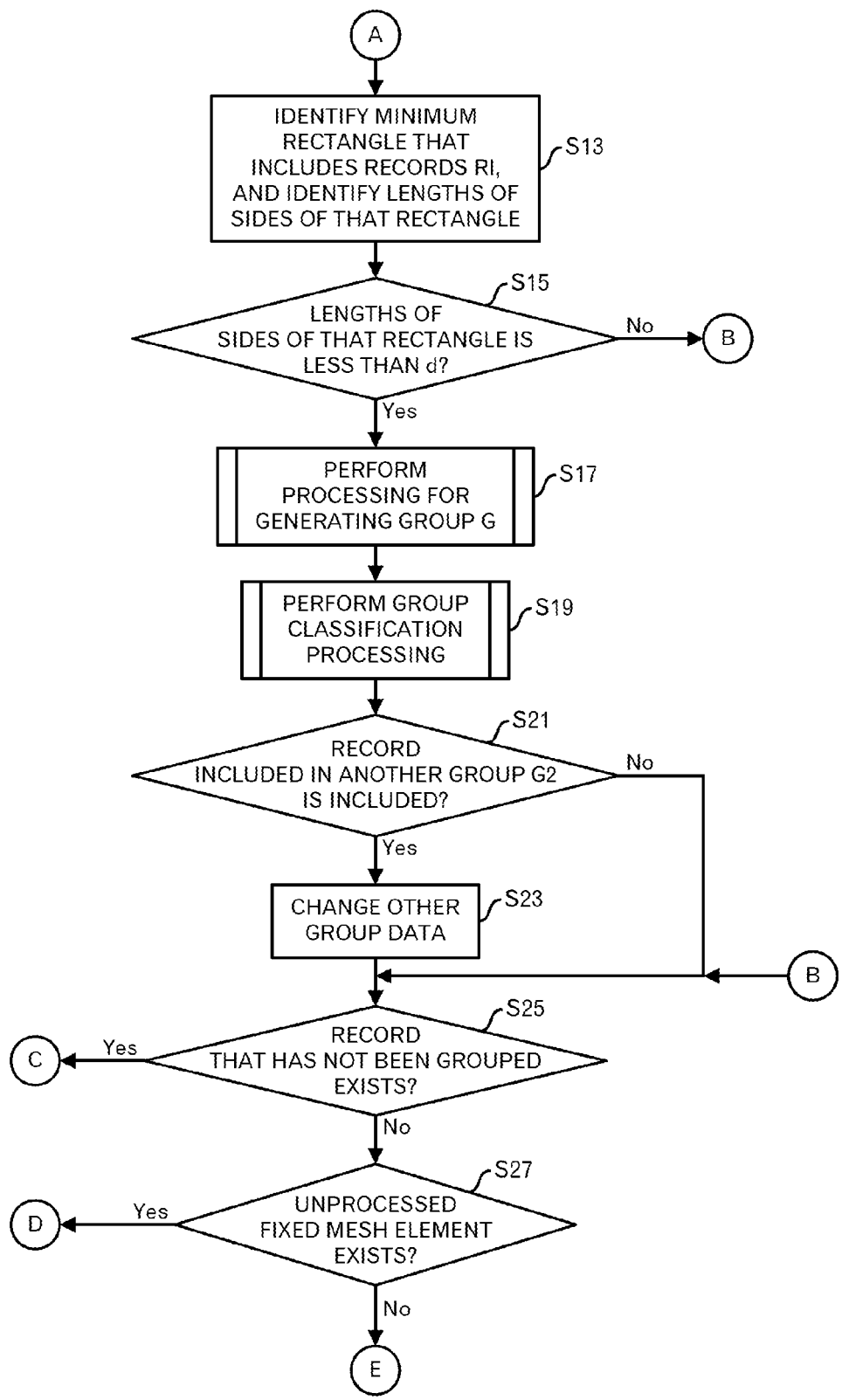
FIG. 11 is a diagram depicting a processing flow in this embodiment of this technique.
Figure 12:
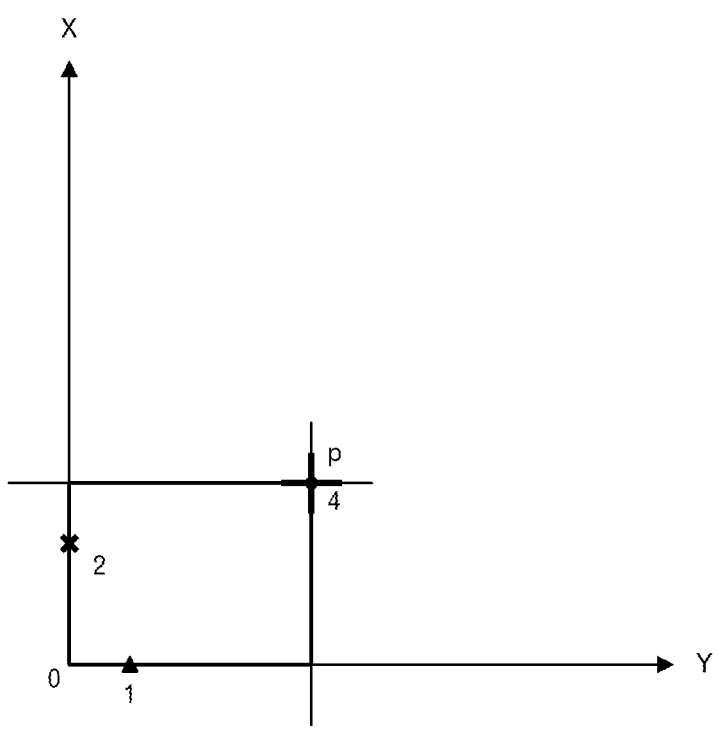
FIG. 12 is a diagram to explain a minimum rectangle that includes the records Rl.
Figure 13:
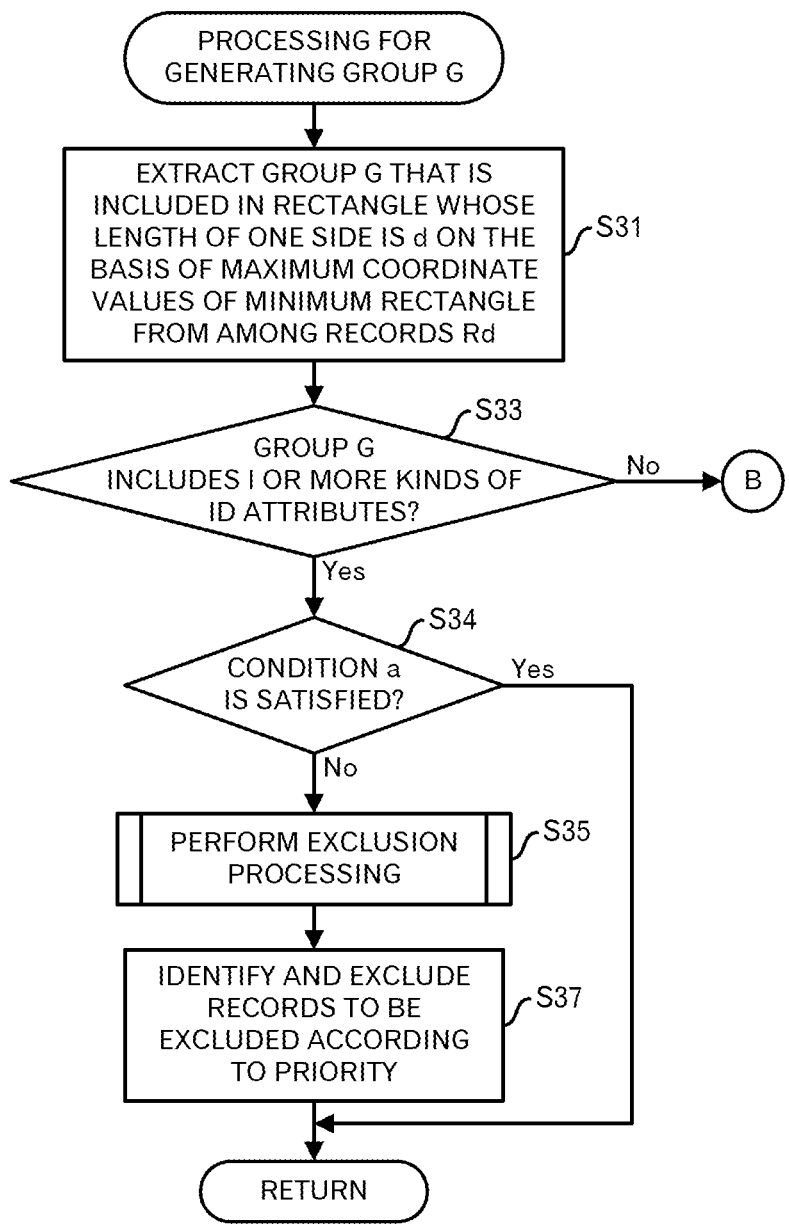
FIG. 13 is a diagram depicting a processing flow of a processing for generating a group G.

Shifting to explanation of the processing in FIG. 11, the grouping processing unit 130 identifies a minimum rectangle that includes the records Rl, and identifies lengths of sides of the rectangle (step S13). In the aforementioned example, as illustrated in FIG. 12, a rectangle whose lower-left vertex is (0, 0) and whose upper right vertex is (3, 4) is identified, and the lengths of the sides of the rectangle are "3" for the vertical side and "4" for the horizontal side. Therefore, the sides are less than d=(6, 6).

The grouping processing unit 130 determines whether or not the lengths of the sides of the rectangle is less than d (step S15). When the lengths of the sides of the rectangle are equal to or greater than d, the processing shifts to the step S25 through the terminal B. On the other hand, when the lengths of the sides of the rectangle are less than d, the grouping processing unit 130 performs a processing for generating a group G (step S17). The processing for generating the group G will be explained by using FIGS. 13 to 21.

Figure 14:
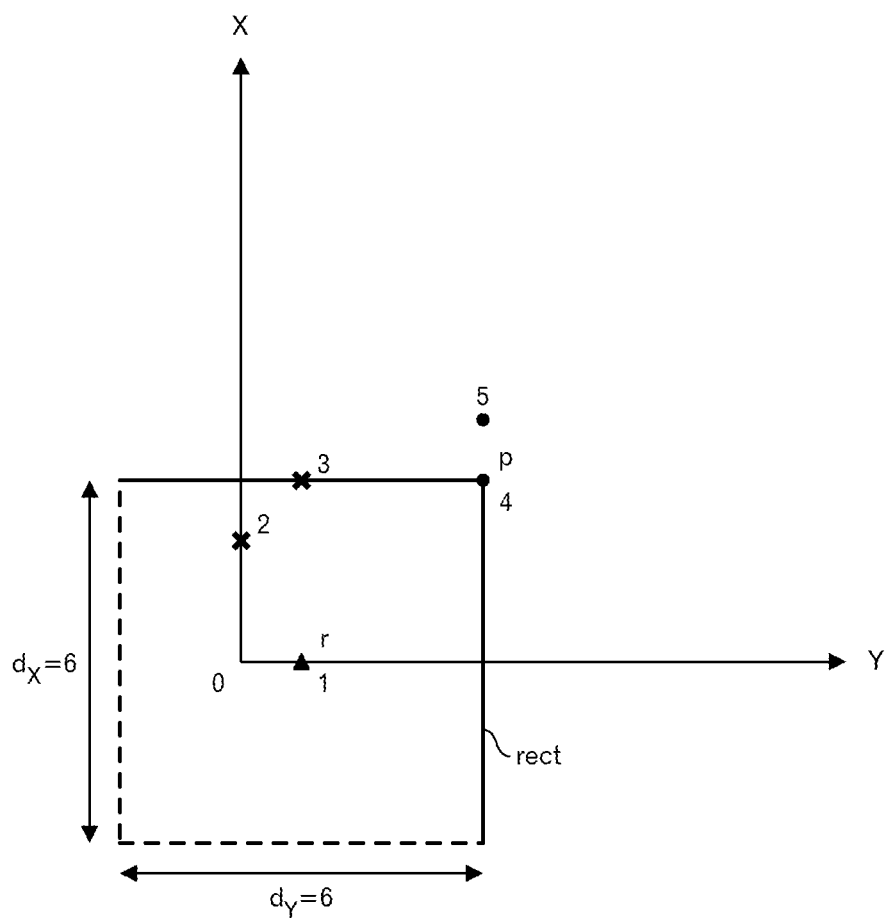
FIG. 14 is a diagram depicting a rectangle rect for the group G.

Firstly, the grouping processing unit 130 extracts records, which are included in a rectangle whose length of one side is d, on the basis of the maximum coordinate values of the minimum rectangle, among the records Rd (step S31). The maximum coordinate values of the minimum rectangle are coordinate values of a point p illustrated in FIG. 12. Specifically, the point p is the upper-right vertex of the minimum rectangle. Then, as illustrated in FIG. 14, a rectangle rect whose length of one side is d and whose upper-right vertex is the point p is generated. In case of this example, because of p=(3, 4), rect=((−3, 3], (−2, 4]) holds. In other words, points on the sides connected with the vertex p are included, however, points on the sides (dotted lines), which are other than the sides connected with the vertex p, are not included. In the example of FIG. 14, records included in the rectangle rect are {1, 2, 3, 4}. Here, the record whose ID is A is only {1}, records whose ID is B are {2, 3}, and a record whose ID is C is only {4}. Therefore, the frequency distribution of the ID attribute is {A:1, B:2, C:1}.

Thus, the reason of the extraction of the records Rd is the efficiency of the processing. Only the record "r" and records that can be included in a rectangle whose side is 2d are included in the group G of the records that are included in an arbitrary rectangle whose size is d and that include the record "r". Therefore, by firstly extracting the candidates, it is possible to prevent from performing extra calculation.

Next, records Rl are extracted in order to efficiently find out an area in which a rectangle, which satisfies the condition 1, is seemed to be made. It is difficult to efficiently find out a rectangle whose size is d and which includes records which include l-kinds of IDs among the records Rd. Then, by extracting records Rl, it becomes possible to efficiently find out such a rectangle when the rectangle is around the record "r". When the records Rl cannot be extracted, it can be understood that the rectangle whose size is d and which includes records which include l-kinds of IDs among the records Rd does not exist. Moreover, when the distance between the record "r" and a farthest record of the records Rl is less than a half of d, it is understood that a rectangle whose size is d and which includes records which include l-kinds of IDs exists as a rectangle whose central point is the record "r", for example.

Then, the reason for generating the rectangle rect whose size is d and whose upper-right vertex is the point p is that the rectangle rect apt to include records which include l-kinds of IDs, and when the rectangle includes the records which include l-kinds of IDs, the rectangle apt to include the records, which are failed to be grouped.

For example, as described above, when the distance between the farthest record of the records Rl and the record "r" is less than the half of the size d, the rectangle rect includes the records Rl. Therefore, the rectangle rect includes the records which include l-kinds of IDs. When the rectangle rect includes the records which include l-kinds of IDs, the group G is generated. Therefore, it is expected to reduce the records that are not grouped in any groups.

Moreover, as described above, because the record r is selected in ascending order of the coordinate values on the XY plane, there are only records that have not selected as the record "r", in other words, that have a lot of chances that the grouping will be still performed, in a direction of the point p when viewed from the record "r". On the other hand, in the other directions, there is a possibility that there are records, which were selected as the record "r", however, were not grouped, in other words, for which the grouping was failed. When the rectangle rect includes the records which include l-kinds of IDs, there are a lot of cases where the records Rl exist near the rectangle rect. In such a case, the rectangle rect extends in a direction which is other than the direction of the point p when viewed from the record "r". In other words, the rectangle rect apt to include records for which the grouping was failed. Therefore, the effect is expected that the records that are not grouped in any groups are reduced.

Then, the grouping processing unit 130 generates the frequency distribution for the group G, and determines whether or not the group G includes ID attribute values whose number of kinds is equal to or greater than "1" (step S33). When the group G does not include the ID attribute values whose number of kinds is equal to or greater than "1", the processing shifts to the step S25 in FIG. 11 through the terminal B. On the other hand, when the group G includes ID attribute values whose number of IDs is equal to or greater than "1", the grouping processing unit 130 determines whether or not the frequency distribution for the group G satisfies the condition "a" (=decrement) in the frequency distribution pattern (step S34). Assume that l=3 and a=0.5 are set. The condition represents that the n-th frequency in descending order of the frequency is equal to or greater than a=0.5 times of the (n−1)-th frequency. In this case, because the frequency distribution {B:2, A:1, C:1} is obtained, it is determined that this condition is satisfied.

The reason of the utilization of the decrement "a" is that no group whose bias of the frequency distribution is too large is generated, in other words, the security is enhanced.

When the frequency distribution for the group G satisfies the condition in the frequency distribution pattern, the processing returns to a calling-source processing. On the other hand, when the frequency distribution for the group G does not satisfy the condition in the frequency distribution pattern, the grouping processing unit 130 performs an exclusion processing (step S35). When the condition "1" is satisfied, it is possible to exclude a record so as to satisfy the condition "a". Therefore, the exclusion processing is executed. The exclusion processing will be explained by using FIGS. 15 to 21.

Then, the grouping processing unit 130 identifies records to be excluded of the number that was determined in the exclusion processing, according to a predetermined priority, and excludes the identified records from the group G (step S37). According to the priority, the records that have been grouped (i.e. transferrable records) are excluded in sequence from the last record in the sorting order, and then the shortage is excluded in sequence from the last record in the sorting order. Then, the processing returns to the calling-source processing.

Figure 15:
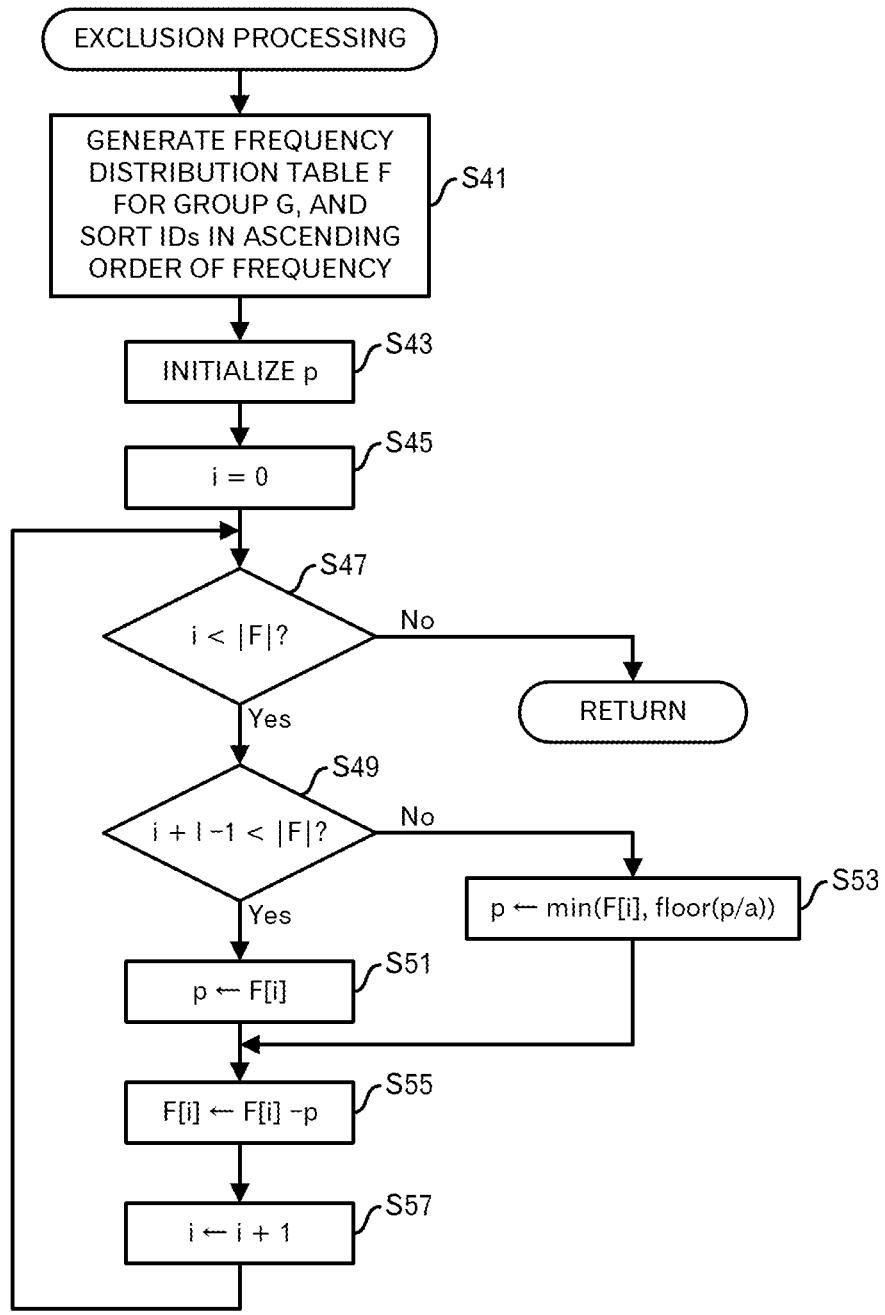
FIG. 15 is a diagram depicting a processing flow of an exclusion processing.

Here, the exclusion processing will be explained. Firstly, the grouping processing unit 130 generates a frequency distribution table F for the group G, and sorts the IDs in ascending order of the frequency (FIG. 15: step S41). Because the exclusion processing is not performed in the aforementioned example, assume that the frequency distribution table F as illustrated in FIG. 16 was generated. In addition, l=4 and a=0.5 hold.

Then, the grouping processing unit 130 initializes a variable p (step S43), and initializes a variable i to 0 (step S45). After that, the grouping processing unit 130 determines whether or not i is less than the number of lines |F| in the frequency distribution table F (step S47). When i is less than the number of lines |F| in the frequency distribution table F, the grouping processing unit 130 determines whether or not (i+1−1) is less than |F| (step S49). When (i+1−1) is less than |F|, the grouping processing unit 130 substitutes F[i] for the variable p (step S51). F[i] is the frequency in (i+1)-th line of F. In case of i=0, the frequency "1" in the first line of F is substituted for the variable p.

On the other hand, when (i+1−1) is equal to or greater than |F|, the grouping processing unit 130 substitutes min (F[i], floor(p/a)) for the variable p (step S53). min (A, B) is a function that outputs a lesser one of A and B.

After the step S51 or S53, the grouping processing unit 130 substitutes F[i]−p for F[i] (step S55). When the step S49 is executed in case of i=0, the frequency distribution table F becomes as illustrated in FIG. 17.

After that, the grouping processing unit 130 increments the variable i by 1 (step S57), and the processing returns to the step S47.

At the second step S47, because of |F|=5 and i=1, i<|F| holds. Moreover, because of l=4, (i+1−1)<|F| holds. Therefore, p=3 is obtained at the step S51, and then F[1]=3−3=0 holds. Then, the frequency distribution table F becomes as illustrated in FIG. 18. After that, i=2 holds.

At the third step S47, because of |F|=5 and i=2, i<|F| holds. In addition, because of l=4, (i+1−1)<|F| does not hold, and the processing shifts to the step S53. Then, because of a=0.5 and p=3, min (F[i]=4, floor(p/a)=6)=4 holds. Therefore, F[2]=4−4=0 holds. Then, the frequency distribution table F becomes as illustrated in FIG. 19. After that, i=3 holds.

At the fourth step S47, because of |F|=5 and i=3, i<|F| holds. Moreover, because of l=4, (i+1−1)<|F| does not hold, and the processing shifts to the step S53. Then, because of a=0.5 and p=4, min (F[i]=9, floor(p/a)=8)=8 holds. Therefore, F[3]=9−8=1 holds. Then, the frequency distribution F becomes as illustrated in FIG. 20. After that, i=4 holds.

At the fifth step S47, because of |F|=5 and i=4, i<|F| holds. Moreover, because of l=4, (i+1−1)<|F| does not hold, and the processing shifts to the step S53. Then, because of a=0.5 and p=8, min (F[i]=10, floor(p/a)=16)=10 holds. Therefore, F[4]=10−10=0 holds. Then, the frequency distribution table F becomes as illustrated in FIG. 21. After that, i=5 holds.

At the sixth step S47, because of |F|=5 and i=5, i<|F| does not hold. Then, the processing returns to the calling-source processing. In other words, the frequency distribution table F (FIG. 21) at this timing represents records to be excluded. Here, one record whose ID is "E" is excluded. As for the records to be excluded, firstly the records that have already been grouped (i.e. transferrable records) are excluded in sequence from the last record in the sorting order, and then the shortage is excluded in sequence from the last record in the sorting order.

Returning to the explanation of the processing in FIG. 11, after the step S17, the grouping processing unit 130 performs a group classification processing (step S19). The group classification processing will be explained by using FIGS. 22 to 28.

Figure 22:
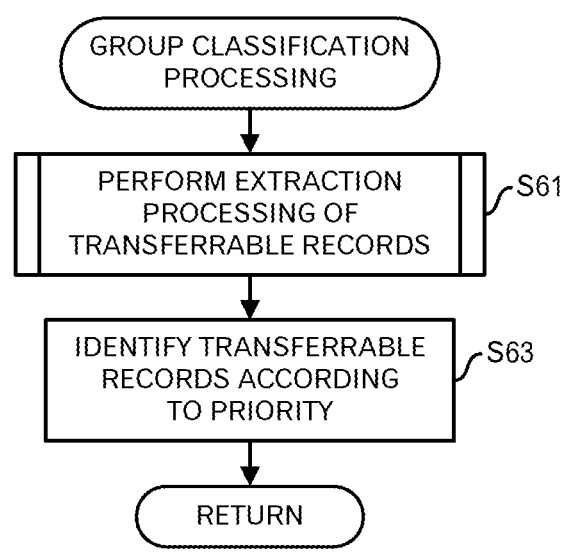
FIG. 22 is a diagram depicting a processing flow of a group classification processing.

Firstly, the grouping processing unit 130 performs a processing for extracting transferrable records (FIG. 22: step S61). In other words, a processing for extracting records other than records that are mandatory in order to satisfy the frequency distribution pattern from among the group G is performed. More specifically, this processing will be explained by using FIGS. 23 to 28.

Figure 23:
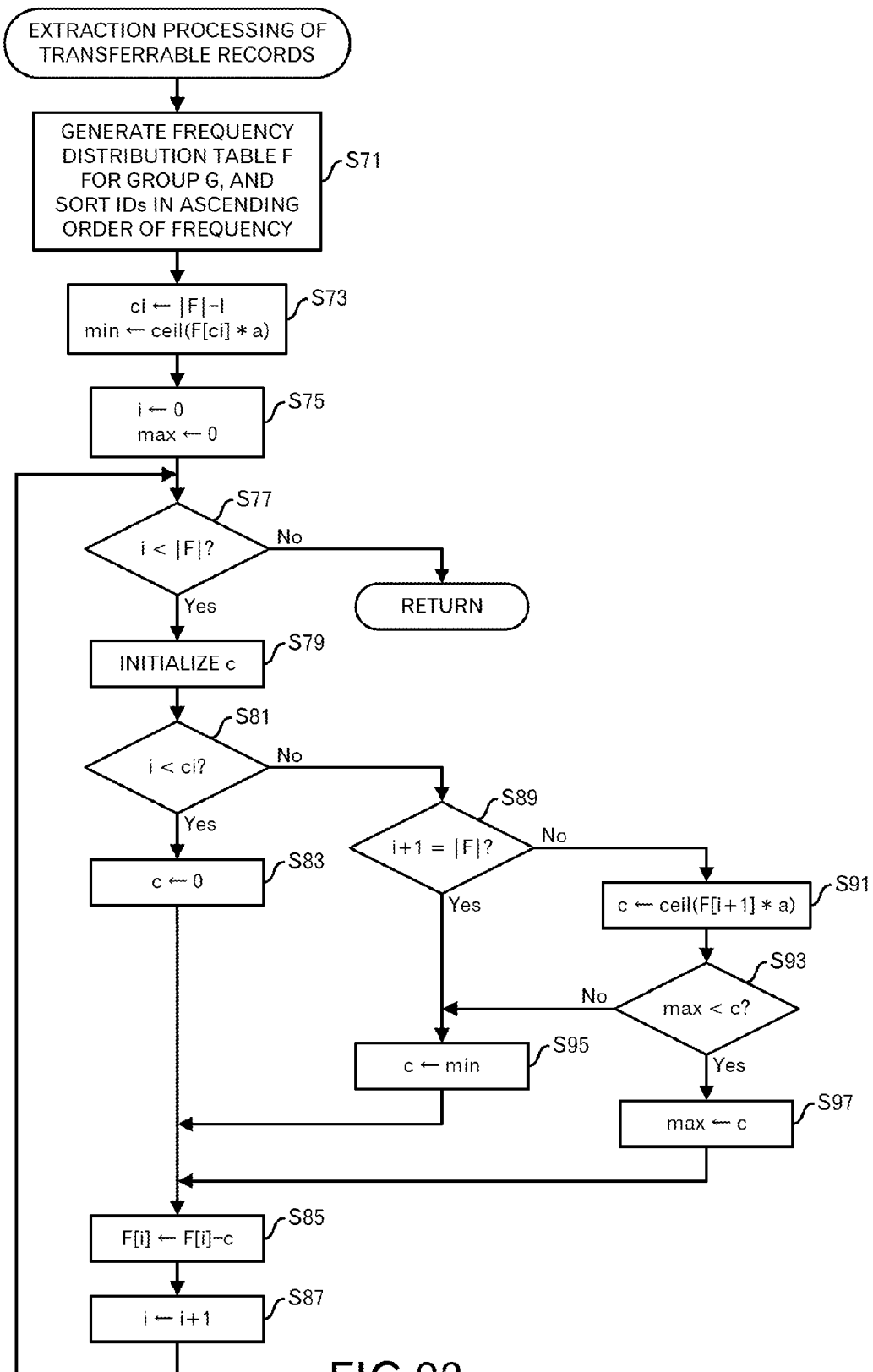
FIG. 23 is a diagram depicting a processing flow of an extraction processing of transferrable records.

Firstly, the grouping processing unit 130 generates a frequency distribution table F for the group G, and sorts the ID in ascending order of the frequency (FIG. 23: step S71). In order to make it easy to understand this processing, assume that the frequency distribution table F as illustrated in FIG. 24 was generated.

Then, the grouping processing unit 130 sets |F|−1 to a variable ci, and sets ceil (F[ci]*a) to a variable min (step S73). ceil (x) is a ceiling function which outputs a minimum integer, equal to or greater than a real number x. F[i] represents the frequency in (i+1)-th line of the frequency distribution table F, and |F| represents the number of lines of the frequency distribution table F. ci=5−4=1 and min=ceil (2*0.5)=1 hold.

In addition, the grouping processing unit 130 initializes a variable i to 0, and initializes a variable max to 0 (step S75).

After that, the grouping processing unit 130 determines whether or not i<|F| holds (step S77). When i<|F| holds, the grouping processing unit 130 initializes a variable c (step S79). After that, the grouping processing unit 130 determines whether or not i<ci holds (step S81). In case of i=0, ci=1 holds. Therefore, this condition is satisfied.

When i<ci holds, the grouping processing unit 130 sets 0 to c (step S83). Then, the grouping processing unit 130 sets F[i]−c to F[i] (step S85). Because F[i]=1 and c=0 hold, F[i]=1 holds. After that, the grouping processing unit 130 increments i by 1 (step S87), and the processing return to step S77.

When i is incremented to 1, i<ci does not hold at the step S81. Therefore, the grouping processing unit 130 determines whether or not i+1=|F| holds (step S89). In case of i=1, because of i+1=2, this condition is not satisfied. When the condition at the step S89 is not satisfied, the grouping processing unit 130 substitutes ceil (F[i+1]*a) for c (step S91). c=ceil (F[2]*0.5)=2 holds. Then, the grouping processing unit 130 determines whether or not max<c holds (step S93). Because of max=0, this condition is satisfied. Then, the grouping processing unit 130 substitutes c for max (step S97). In other words, max=c=2 holds. After that, the processing shifts to the step S85. Therefore, at the second step S85, F[1]=2−2=0 holds. Therefore, the frequency distribution table F becomes as illustrated in FIG. 25.

When i is incremented to 2, i<ci does not hold at the step S81. Therefore, the processing shifts to the step S89. However, because i+1<|F| holds, the processing shifts to the step S91, and c=ceil (F[3]*a)=2 holds. Because of max=2, the condition max<c is not satisfied. Then, the grouping processing unit 130 substitutes min for c (step S95). Because of min=1, c=1 holds. Then, the processing shifts to the step S85, and at the third step S85, F[2]=3−1=2 holds. Therefore, the frequency distribution table F becomes as illustrated in FIG. 26.

When i is incremented to 3, i<ci does not hold at the step S81. Therefore, the processing shifts to the step S89. However, because of i+1<|F|, the processing shifts to the step S91, and c=ceil (F[4]*a)=3 holds. Because of max=2 and c=3, the condition max<c is satisfied. Therefore, max=c=3 holds. Then, at the fourth step S85, F[3]=4−3=1 holds. Therefore, the frequency distribution table F becomes as illustrated in FIG. 27.

When i is incremented to 4, i<ci does not hold at the step S81. Therefore, the processing shifts to the step S89. i+1<|F| is not satisfied. Then, the processing shifts to the step S95, and c=min=1 holds. Then, the processing shifts to the step S85, and at the fifth step S85, F[4]=F[4]−c=5−1=4 holds. Therefore, the frequency distribution table F becomes as illustrated in FIG. 28.

After that, when i is incremented to 5, the condition i<|F| is not satisfied at the step S77. Therefore, the processing returns to the calling-source processing. Therefore, as illustrated in FIG. 28, one record whose ID is A, two records whose ID is C, one record whose ID is D and 4 records whose ID is E are identified as being transferrable records.

Returning to the explanation of the processing in FIG. 22, the grouping processing unit 130 specifically identifies the transferrable records according to the predetermined priority (step S63). As for the priority, the transferrable record (which can be transferred) is determined by selecting a record whose ID of the fixed mesh element is rearer in the sorting order, and selecting a record whose numeric attribute value is rearer in the sorting order when the turn regarding the ID of the fixed mesh element is the same.

In the first example, the group G includes records {1, 2, 3, 4}, and when the aforementioned processing is performed, one record whose ID is B can be transferred. Therefore, when the record is selected according to the priority, the record {3} is selected.

According to the processing explained up to here, a group correspondence table as illustrated in FIG. 29 and a group information table as illustrated in FIG. 30 are obtained.

The group correspondence table as illustrated in FIG. 29 is configured to identify a group ID from the line number. The group ID is appropriately set to be unique to the group. For example, the line number of the record r is used. The group information table illustrated in FIG. 30 is a table in which the untransferrable records and the transferrable records are separately recorded for each group. The processing efficiency is good, because the condition such as the condition "a" (i.e. decrement) that enables to calculate whether or not the condition is satisfied, even when arbitrary IDs of the arbitrary number are transferred, is used.

Returning to the explanation of the processing in FIG. 11, the grouping processing unit 130 determines whether or not the group G of the records includes a record that is included in another group G2 (i.e. transferrable record) (step S21). When the group G includes a record included in another group G2, the grouping processing unit 130 changes the group correspondence table and group information table for another group G2 so as to delete data for that record from the group correspondence table and group information table for another group G2 (step S23). On the other hand, when the group G does not include any record included in another group G2, the processing shifts to the step S25.

Then, the grouping processing unit 130 determines whether or not there is a record that has not been grouped for the identified fixed mesh element m (step S25). When there is a record that has not been grouped, the processing returns to the step S5 in FIG. 5 through terminal C. On the other hand, when there is no record that has not been grouped for the identified fixed mesh element m, the grouping processing unit 130 determines whether or not there is an unprocessed fixed mesh element in the correspondence table (step S27). When there is an unprocessed fixed mesh element, the processing shifts to the step S3 in FIG. 5 through terminal D. On the other hand, when there is no unprocessed fixed mesh element, the processing shifts to the processing in FIG. 35A through terminal E.

The record that has not been grouped among records {1, 2, 3, 4, 5}, which belong to the fixed mesh element m=(0, 0), is a record 5 ((X, Y)=(4, 4)), and becomes the record r. In such a case, the records in the neighboring fixed mesh elements are records {1, 2, 3, 4, 5, 6, 7, 8, 9}. However, when records {1, 2, 4}, which have been grouped and cannot be transferred, are excluded from among records that have numerical attribute values in the range of 4−6<X<4+6 and 4−6<Y<4+6, the records Rd={3, 5, 6, 7, 8, 9} are obtained.

Then, when the records Rl, which satisfy 1=3 when using the record 5 as the central point, are extracted, Rl={3, 5, 9} are obtained. Then, the minimum rectangle of the records Rl is represented by (X, Y)=([3, 7], [1, 4]). The upper left point of this minimum rectangle is the point p=(7, 4). Therefore, when generating a rectangle rect that has the size d=(6, 6) on the basis of this point p, rect: (X, Y)=((1, 7], (−2, 4]) is obtained. From the records Rd included in this rectangle rect, the group G of the records {3, 5, 8, 9} is obtained. The frequency distribution of the ID attribute of this group G satisfies the conditions "1" and "a" in the frequency distribution pattern. The frequency distribution of this group G becomes {A:2, B:1, C:1}, and therefore, the record "9" whose ID is A can be transferred.

Therefore, the group correspondence table as illustrated in FIG. 31 and the group information table as illustrated in FIG. 32 are obtained. Here, the record 3 is transferred from the group 1. Therefore, the record correspondence table and group information table for the group 1 are changed. Totally, by the processing up to this stage, the group correspondence table changes as illustrated in FIG. 33, and the group information table changes as illustrated in FIG. 34. The record 3 is excluded from the group 1, and the record 3 belongs to the group 5.

Only records {6, 7} are left, however, they are not grouped in this processing up to this stage.

Figure 35A:
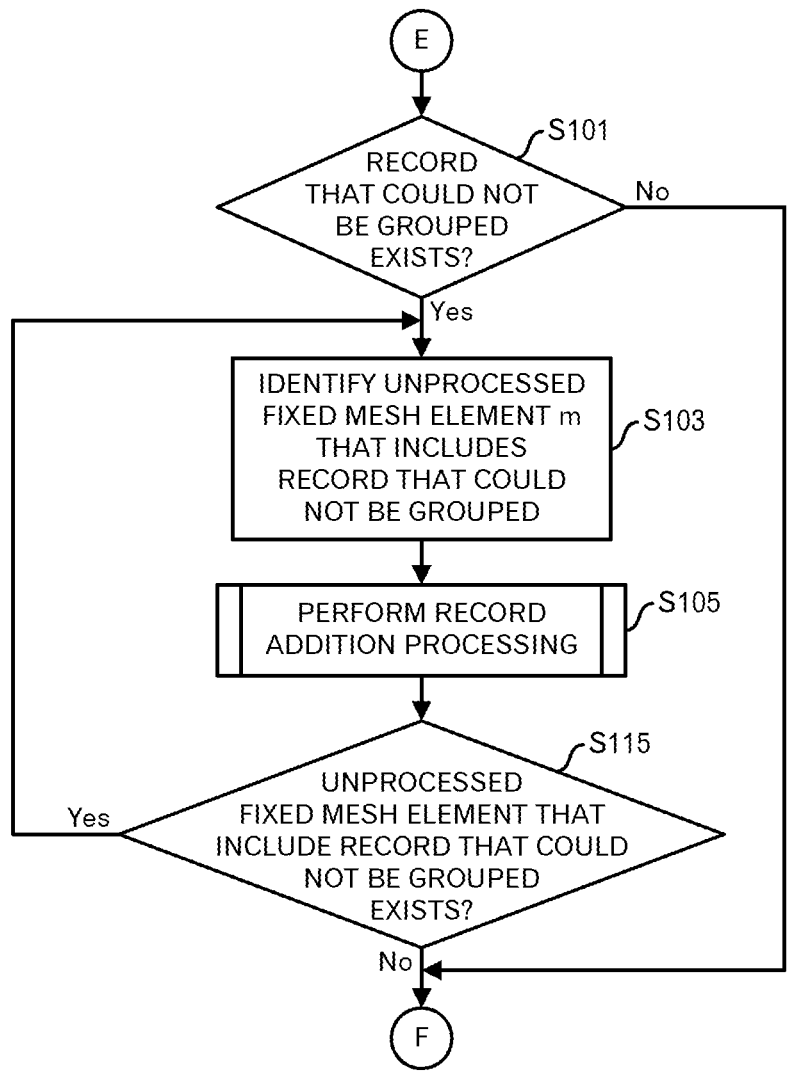
FIG. 35A is a diagram depicting a processing flow in this embodiment of this technique.
Figure 35B:
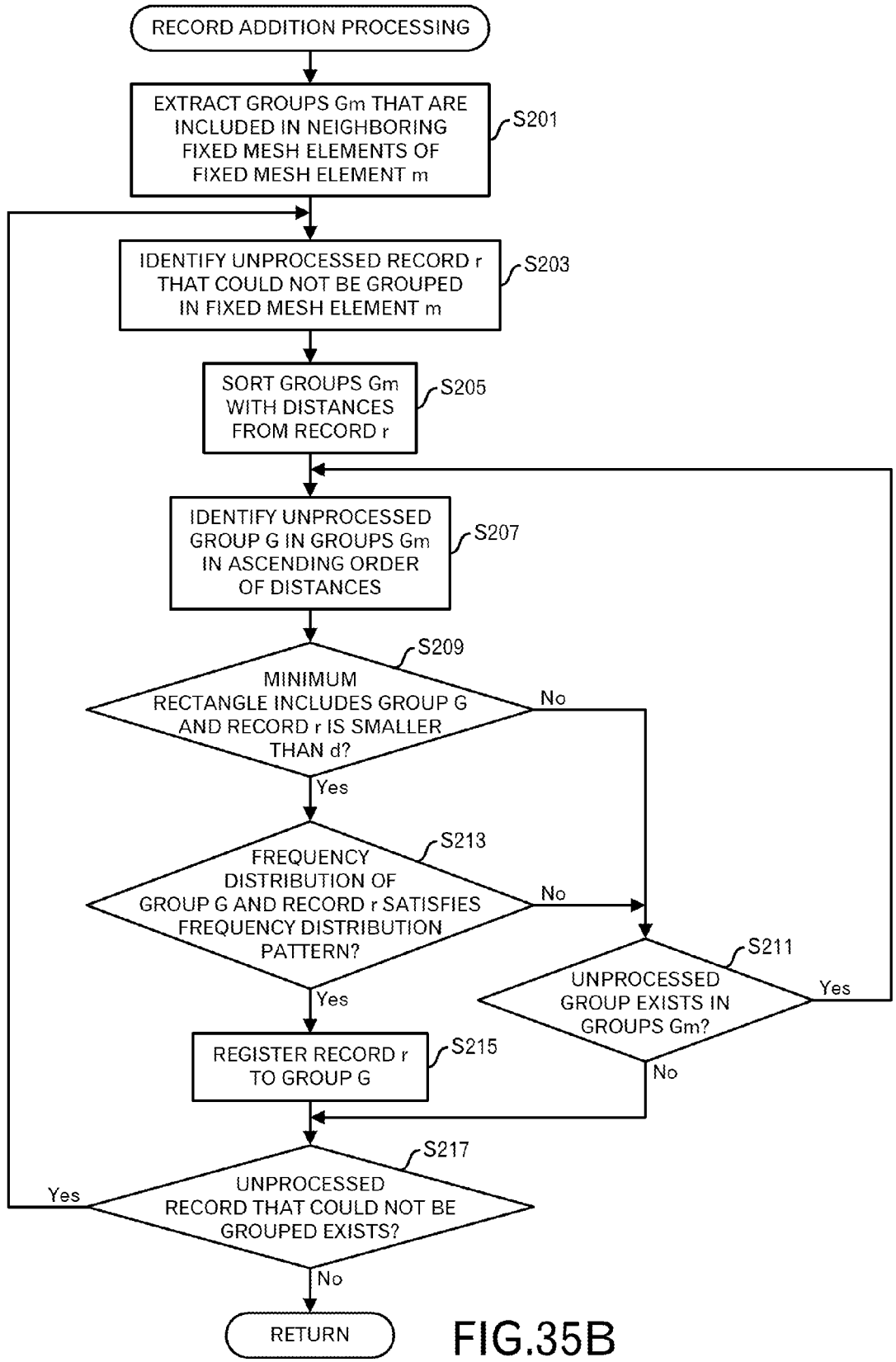
FIG. 35B is a diagram depicting a processing flow of a record addition processing in this embodiment of this technique.

Then, the processing shifts to the processing in FIG. 35A through the terminal E. The grouping processing unit 130 determines whether or not there is a record that could not be grouped (FIG. 35A: step S101). It is possible to determine that the records that have not registered in the group correspondence table could not be grouped. When there is no record that could not be grouped, the processing shifts to the processing in FIG. 39 through terminal F.

Figures 36, 37:
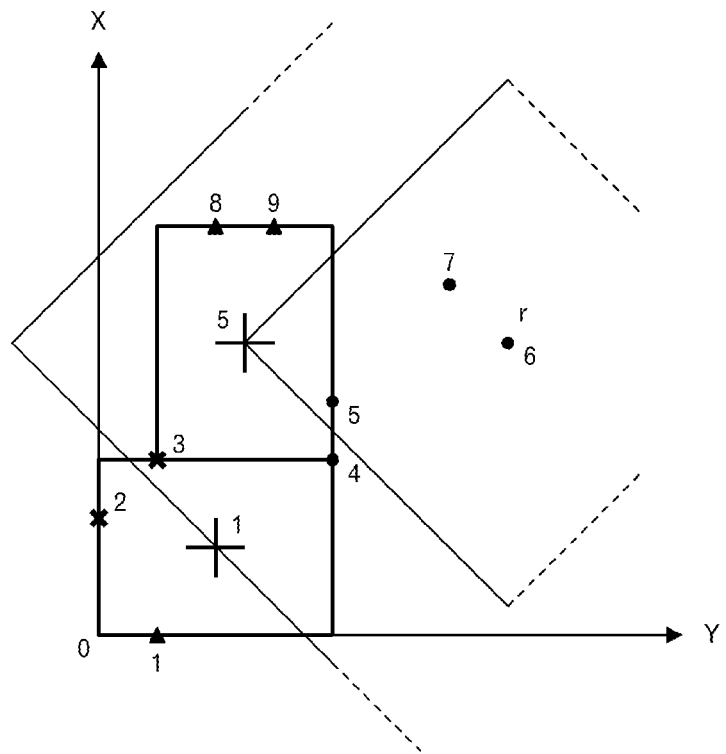
FIG. 36 is a diagram to explain grouping of a record that was not grouped.
FIG. 37 is a diagram depicting an example of a group correspondence table.

On the other hand, when there is a record that could not be grouped, the grouping processing unit 130 identifies one unprocessed fixed mesh element m, which includes the record that could not be grouped (step S103). Then, the grouping processing unit 130 performs a record addition processing (step S105). The record addition processing will be explained by using FIG. 35B. The grouping processing unit 130 extracts a list Gm of groups that are included in the neighboring fixed mesh elements of the fixed mesh element m (step S201). Here, only when all records included in a group is included in the neighboring fixed mesh elements, that group becomes an element of the list Gm. Furthermore, the grouping processing unit 130 identifies one unprocessed record r that could not be grouped in the identified fixed mesh element m (step S203). Then, the grouping processing unit 130 sorts the list Gm with distances from the record r (step S205). Here, the distance of the record with the group is defined to be a Manhattan distance between the central point of the minimum rectangle of the group and the record, for example. Furthermore, the grouping processing unit 130 identifies an unprocessed group G in the list Gm in ascending order of the distance (step S207). Then, the grouping processing unit 130 determines whether or not the minimum rectangle that includes the group G and the record r is smaller than d (step S209). For example, when the ID of the fixed mesh element that includes the minimum rectangle is identified in advance for each group, and the central coordinates of the minimum rectangle are identified in advance, the speed of the processing is enhanced. When it is assumed that the record 6 ((X, Y)=(5, 7)) in the fixed mesh element (0, 1) is identified at the step S203, the neighboring fixed mesh elements of this fixed mesh element include the groups 5 and 1. Therefore, the groups 5 and 1 are included in the list Gm. Here, a state as illustrated in FIG. 36 is obtained. When sorting both groups with the Manhattan distance with the central point of the minimum rectangle of each group on the basis of the record 6, it can be understood that the group 5 is closer. The minimum rectangle including the group 5 and the record 6 is larger than d. Therefore, the processing shifts to the step S211. In other words, when the condition at the step S209 is not satisfied, the processing shifts to the step S211. Then, the grouping processing unit 130 determines whether or not there is an unprocessed group in the list Gm (step S211). When there is an unprocessed group, the processing returns to the step S207. In an example of FIG. 36, there is an unprocessed group 1, the processing shifts to the step S207. When the group 1 is selected as the group G and the processing proceeds similarly, it is determined at the step S209 that the condition is not satisfied. Then, the processing shifts to the step S211. When there is no unprocessed group in the list Gm any more, the processing shifts to the step S217.

On the other hand, when the minimum rectangle that includes the group G and the record r is smaller than d, the grouping processing unit 130 determines whether or not the frequency distribution in case where the record r is added to the group G satisfies the frequency distribution pattern (step S213). When the record r is the record 7, the minimum rectangle that includes the group 5 and the record 7 is smaller than d, therefore, the condition of the step S213 is satisfied. Furthermore, the frequency distribution {A:2, B:1, C:2} is obtained, hence, the conditions "1" and "a" are satisfied.

Figures 38, 40, 41:
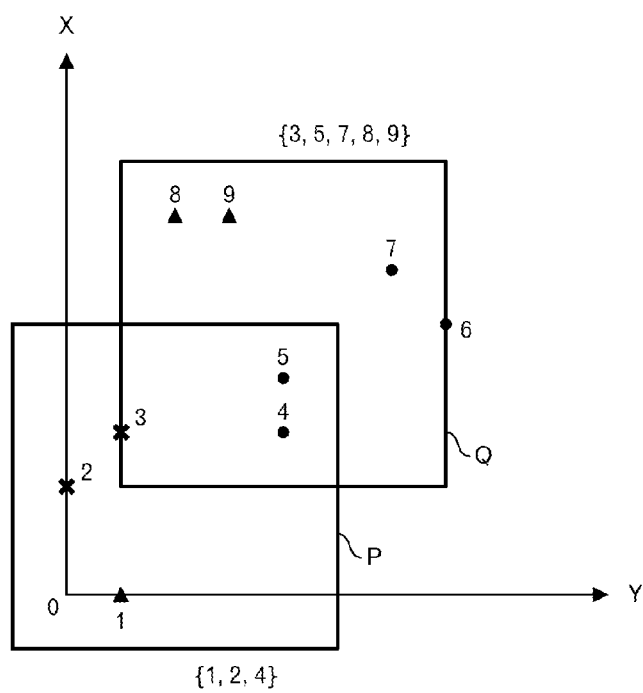
FIG. 38 is a diagram depicting an example of a group information table.
FIG. 40 is a diagram to explain a rectangle that is randomly generated.
FIG. 41 is a diagram depicting an example of a record registered in an output table.

When the frequency distribution does not satisfy the frequency distribution pattern, the processing shifts to the step S211. On the other hand, when the frequency distribution in case where the record r is added to that group satisfies the frequency distribution pattern, the grouping processing unit 130 additionally registers the record r to the group G (step S215). In other words, the group correspondence table as illustrated in FIG. 37 is obtained, and the group information table as illustrated in FIG. 38 is obtained. The group correspondence table and group information table are stored in the second data storage unit 140.

After that, the grouping processing unit 130 determines whether or not there is an unprocessed record that could not be grouped for the identified fixed mesh element (step S217). When there is an unprocessed record, the processing returns to the step S203. On the other hand, when there is no unprocessed record, the processing returns to the processing in FIG. 35A. Returning to the explanation of FIG. 35A, the grouping processing unit 130 determines whether or not there is an unprocessed fixed mesh element that includes the record that could not be grouped (step S115). When there is an unprocessed fixed mesh element that includes the record that could not be grouped, the processing shifts to the step S103. On the other hand, when there is no unprocessed fixed mesh element that includes the record that could not be grouped, the processing shifts to the processing in FIG. 39 through the terminal F.

Figure 39:
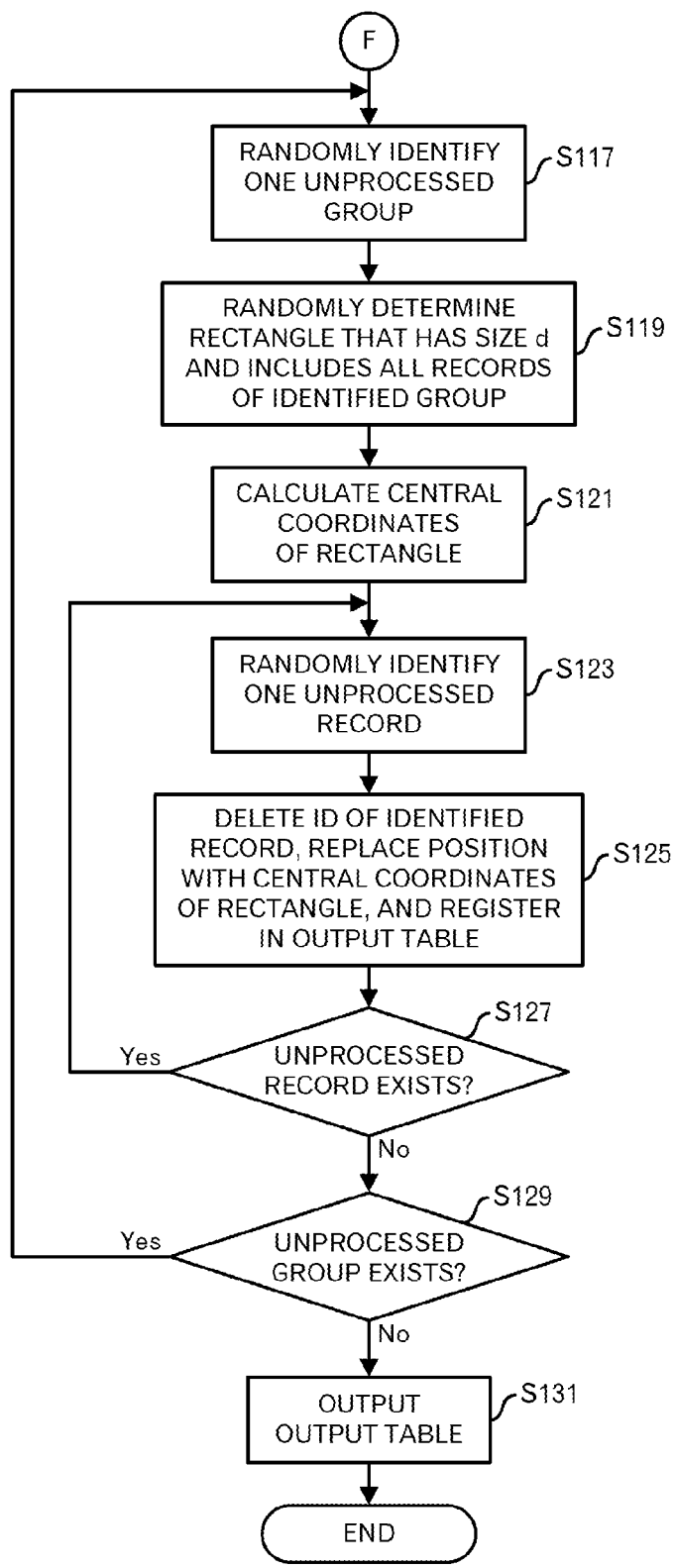
FIG. 39 is a diagram depicting a processing flow in this embodiment of this technique.

Shifting to the explanation of the processing in FIG. 39, when the processing of the grouping processing unit 130 ends, the anonymizing processing unit 150 randomly identifies one unprocessed group in the second data storage unit 140 (step S117). Moreover, the anonymizing processing unit 150 randomly determines a rectangle that has the size d and includes all records of the identified group (step S119). For example, as illustrated in FIG. 40, a rectangle P for the group 1, which includes the records {1, 2, 4}, is set. Later, a rectangle Q for the group 5, which includes the records {3, 5, 7, 8, 9} is also set. Also in FIG. 40, points that have different forms for each ID are plotted.

There is no possibility that such rectangles P and Q are included in an area (e.g. A's house site), in which only specific IDs exist. Moreover, because there are not enough records, which have different IDs, near the record 6, the record 6 is not disclosed. The rectangles P and Q overlap, however, it can be understood that the record 3 (whose ID is B) is adequately shared with them.

Then, the anonymizing processing unit 150 calculates the central coordinates of the determined rectangle (step S121). Coordinates other than the central coordinates may be employed. After that, the anonymizing processing unit 150 randomly identifies one unprocessed record that belongs to the identified group (step S123). Then, the anonymizing processing unit 150 reads out data of the identified record from the first data storage unit 110, deletes ID, replaces the positional coordinates X and Y with the rectangular central coordinates, and registers modified data in an output table in the third data storage unit 160 (step S125). For example, when the record 2 is firstly selected as illustrated in FIG. 41, the ID is deleted, and the positional coordinates X and Y are replaced from (2, 0) to the central coordinates (2, 2). The attribute value of the speed is not changed. However, an attribute value of the speed attribute may be converted.

Then, the anonymizing processing unit 150 determines whether or not there is an unprocessed record in the identified group (step S127). When there is an unprocessed record, the processing returns to the step S123. On the other hand, when there is no unprocessed record, the anonymizing processing unit 150 determines whether or not there is an unprocessed group (step S129). When there is an unprocessed group, the processing returns to the step S117. On the other hand, when there is no unprocessed group, the output unit 170 outputs the output table in the third data storage unit 160 to an output device such as a display device, printer or the like (step S131).

Figures 42, 43:
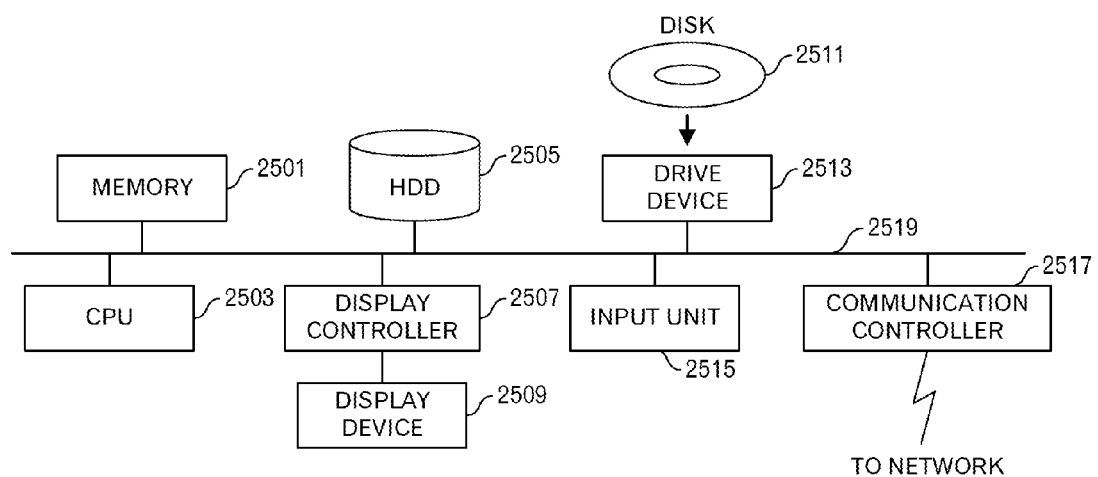
FIG. 42 is a diagram depicting an example of the output table.
FIG. 43 is a functional block diagram of a computer.

In the aforementioned example, data as illustrated in FIG. 42 is outputted. In an example of FIG. 42, the line numbers are included, however, such data may be deleted.

By performing the aforementioned processing, only records that have been grouped are disclosed, however, each group includes l-kinds of secret attribute values. Therefore, the range of each group is not included in the area in which only specific IDs are sure to exist, and the anonymity is guaranteed.

Moreover, because each range in which the disclosed records exist is smaller than the size d, high precision analysis can be made by designating small d. However, when d is smaller, the number of records that are not classified to any range increases and such records are not disclosed. Therefore, it is not preferable that d is reduced too much.

Furthermore, by permitting that ranges that include records of respective groups overlap, it is possible to reduce the number of records that are not classified to any range. This makes the number of disclosed records increase, in other words an amount of data that can be used for the analysis increases. Therefore, the analysis with the high precision is expected.

In other words, according to this embodiment, when d is designated, it is possible to disclose data with the accuracy appropriate for the designated d while the anonymity is guaranteed. For example, by determining d based on the measurement error or resolution on the analysis side, it is possible to achieve the anonymity and the analysis accuracy in a best form.

Although the embodiments of this technique were explained, this technique is not limited to this. For example, the processing flow is a mere example, and as long as the processing results do not change, the turns of the processing may be replaced or plural steps may be executed in parallel.

Especially, the aforementioned method for setting the rectangle rect is a mere example. It is possible to set it without any relation with the rectangles for other groups. Therefore, it is possible to set the rectangle by mainly considering the records included in the group.

In addition, in the aforementioned example, the numeric attribute is two-dimensional, however, may be one dimensional or three or more dimensional. In such a case, instead of the rectangle, a segment or cuboid may be used according to the dimension.

Furthermore, the information processing apparatus 100 may not be one computer, and functions may be shared with plural computers. Furthermore, a server-client-type implementation form may be employed.

In addition, the aforementioned information processing apparatus 100 is a computer device as depicted in FIG. 43. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as depicted in FIG. 43. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

A method for generating anonymized data, which relates to the embodiments, includes (A) extracting, from plural data blocks, each of which includes a secret attribute value and a numeric attribute value, plural groups of data blocks, wherein each of the plural groups includes data blocks that include a first data block, which has not been grouped, whose frequency distribution of the secret attribute value satisfies a predetermined condition and whose numeric attribute values are within a certain area that has a predetermined size; and (B) replacing the numeric attribute values of the data blocks that belong to each group of the plural groups with a numeric attribute value calculated for the group. And, the certain area is determined without any relation with other certain areas for other groups.

Because the certain area is determined without any relation with other certain areas for other groups, the certain areas may overlap. However, it becomes easy to generate groups whose frequency distribution of the secret attribute value satisfies the predetermined condition, and the number of records that cannot be grouped is reduced. In other words, an amount of data that can be used for the analysis increases and the analysis accuracy is enhanced. Moreover, the size of the certain area is adjustable, and this point is also a primary factor for the enhancement of the analysis accuracy.

Moreover, the aforementioned method may further include (C) deleting the secret attribute value of each data block that belongs to each of the plural groups. This is performed in order to keep the secret.

Furthermore, the aforementioned extracting may include (a1) determining whether frequency distribution for a set of data blocks that include the first data block and whose numeric attribute values are within the certain area satisfies the predetermined condition; and (a2) upon determining that the set of data blocks does not satisfy the predetermined condition, generating a group of data blocks so as to satisfy the predetermined condition by excluding a second data block from the set of data blocks. The second data block that is excluded as described above is used for the extraction of another group. Therefore, the overlap of the certain areas occurs.

Furthermore, the aforementioned extracting may include: (a3) extracting, from a group of data blocks, a third data block that is other than data blocks, which are mandatory for a state where the frequency distribution of the secret attribute value satisfies the predetermined condition. In such a case, when another group of data blocks is extracted, the third data block is extracted for the another group. Because the third data block is used for the extraction of another group, it becomes easy to extract groups.

Moreover, the aforementioned condition may include a lower limit value for a number of kinds of secret attribute values. In such a case, the aforementioned extracting may include: (a4) extracting a fourth data block so as to become equal to or greater than the lower limit value on the basis of the first data block; and (a5) determining the certain area that has the predetermined size based on a numeric attribute value of the extracted fourth data block. Because, when the fourth data block cannot be extracted within a predetermined range from the first data block, it is impossible to extract a group, the processing shifts to a processing for other data blocks.

Furthermore, the aforementioned method may further include: (D) upon detecting that a fifth data block that is not grouped to any groups, classifying the fifth data block to a group for a sixth data block, when a distance between a reference position of a certain area that includes the sixth data block and the fifth data block is equal to or less than a distance that corresponds to the predetermined size, and the frequency distribution of the secret attribute value still satisfies the predetermined condition even when the fifth data block is added to the group for the sixth data block. It becomes possible to perform grouping of data blocks as many as possible.

In addition, the aforementioned replacing may include (b1) randomly generating an area that includes the numeric attribute values of data blocks, which belong to a group, and that has the predetermined size; and (b2) replacing the numeric attribute values of the data blocks, which belong to the group, with a numeric attribute value that corresponds to a position within the generated area. With this configuration, it becomes possible to perform anonymization while keeping characteristics of the groups.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An anonymized data generation method, comprising:
generating, by using a computer and from a plurality of data blocks each of which includes a secret attribute value and a numeric attribute value, a plurality of groups each of which includes plural data blocks that satisfy a predetermined condition, wherein the predetermined condition includes a first condition and a second condition, the first condition being a condition that frequency distribution of secret attribute values included in the plural data blocks matches a predetermined pattern, and the second condition being a condition that points represented by numeric attribute values included in the plural data blocks are included in a first area that has a predetermined size; and
replacing, by using the computer and for each of the plurality of groups, a numeric attribute value included in each of plural data blocks that belong to the group with a numeric attribute value calculated for the group, and
wherein the generating comprises:
classifying each of the plurality of data blocks into any of a plurality of second areas that have the predetermined size and do not overlap with each other, based on a numeric attribute value included in the data block; and
upon detecting that a set of data blocks included in a certain second area does not satisfy the predetermined condition, changing the set by deleting a data block from the set and/or adding, to the set, a data block included in another second area adjacent to the certain second area, so that changed set satisfies the predetermined condition.

2. The anonymized data generation method as set forth in claim 1, further comprising deleting, by using the computer and for each of the plurality of groups, secret attribute values included in plural data blocks that belong to group.

3. The anonymized data generation method as set forth in claim 1, wherein the generating comprises extracting, from a group of the plurality of groups, a first data block that is other than data blocks, which are mandatory for a state where the first condition is satisfied.

4. The anonymized data generation method as set forth in claim 1, wherein the first condition includes a lower limit value for a number of kinds of secret attribute values, and the changing comprises:
extracting, on a basis of a data block included in the set and from the another second area, a second data block that is to be added to the set so that a number of kinds of secret attribute values included in the data blocks included in the set and the second data block is equal to or greater than the lower limit value; and
determining the first area that has the predetermined size based on a numeric attribute value included in the extracted second data block.

5. The anonymized data generation method as set forth in claim 1, further comprising upon detecting that a third data block that does not belong to any of the plurality of groups, classifying, by using the computer, the third data block to a group of the plurality of groups, when a distance between a point represented by a numerical attribute value included in the third data block and a reference position of a certain area that includes points represented by numerical attribute values included in plural data blocks that belong to the group is equal to or less than a distance that corresponds to the predetermined size, and the first condition is still satisfied even when the third data block is added to the group.

6. The anonymized data generation method as set forth in claim 1, wherein the replacing comprises:
randomly generating, for each of the plurality of groups, an area that has the predetermined size and includes points represented by numeric attribute values included in plural data blocks which belong to the group; and
replacing, for each of the plurality of groups, a numeric attribute value included in each of plural data blocks which belong to the group with a numeric attribute value that corresponds to a position within an area generated for the group.

7. A non-transitory computer-readable storage medium storing a program that causes a computer to execute a process, the process comprising:
generating, from a plurality of data blocks each of which includes a secret attribute value and a numeric attribute value, plural a plurality of groups each of which includes plural data blocks that satisfy a predetermined condition, wherein the predetermined condition includes a first condition and a second condition, the first condition being a condition that frequency distribution of secret attribute values included in the plural data blocks matches a predetermined pattern, and the second condition being a condition that points represented by numeric attribute values included in the plural data blocks are included in a first area that has a predetermined size; and
replacing, for each of the plurality of groups, a numeric attribute value included in each of plural data blocks that belong to the group with a numeric attribute value calculated for the group, and
wherein the generating comprises:
classifying each of the plurality of data blocks into any of a plurality of second areas that have the predetermined size and do not overlap with each other, based on a numeric attribute value included in the data block; and
upon detecting that a set of data blocks included in a certain second area does not satisfy the predetermined condition, changing the set by deleting a data block from the set and/or adding, to the set, a data block included in another second area adjacent to the certain second area, so that changed set satisfies the predetermined condition.

8. An information processing apparatus, comprising
a memory; and
a processor coupled to the memory and configured to:
generate, from a plurality of data blocks each of which includes a secret attribute value and a numeric attribute value, a plurality of groups each of which includes plural data blocks that satisfy a predetermined condition, wherein the predetermined condition includes a first condition and a second condition, the first condition being a condition that frequency distribution of secret attribute values included in the plural data blocks matches a predetermined pattern, and the second condition being a condition that points represented by numeric attribute values included in the plural data blocks are included in a first area that has a predetermined size; and
replace, for each of the plurality of groups, a numeric attribute value included in each of plural data blocks that belong to the group with a numeric attribute value calculated for the group, and
wherein the generating comprises:
classifying each of the plurality of data blocks into any of a plurality of second areas that have the predetermined size and do not overlap with each other, based on a numeric attribute value included in the data block; and
upon detecting that a set of data blocks included in a certain second area does not satisfy the predetermined condition, changing the set by deleting a data block from the set and/or adding, to the set, a data block included in another second area adjacent to the certain second area, so that changed set satisfies the predetermined condition.

* * * * *